July 21, 1959  A. ST. JOHNSTON  2,895,671
ELECTRONIC DIGITAL COMPUTING MACHINES
Filed March 23, 1954  17 Sheets-Sheet 1

Inventor:
Andrew St. Johnston
By Stevens, Davis, Miller & Mosher
Attorneys

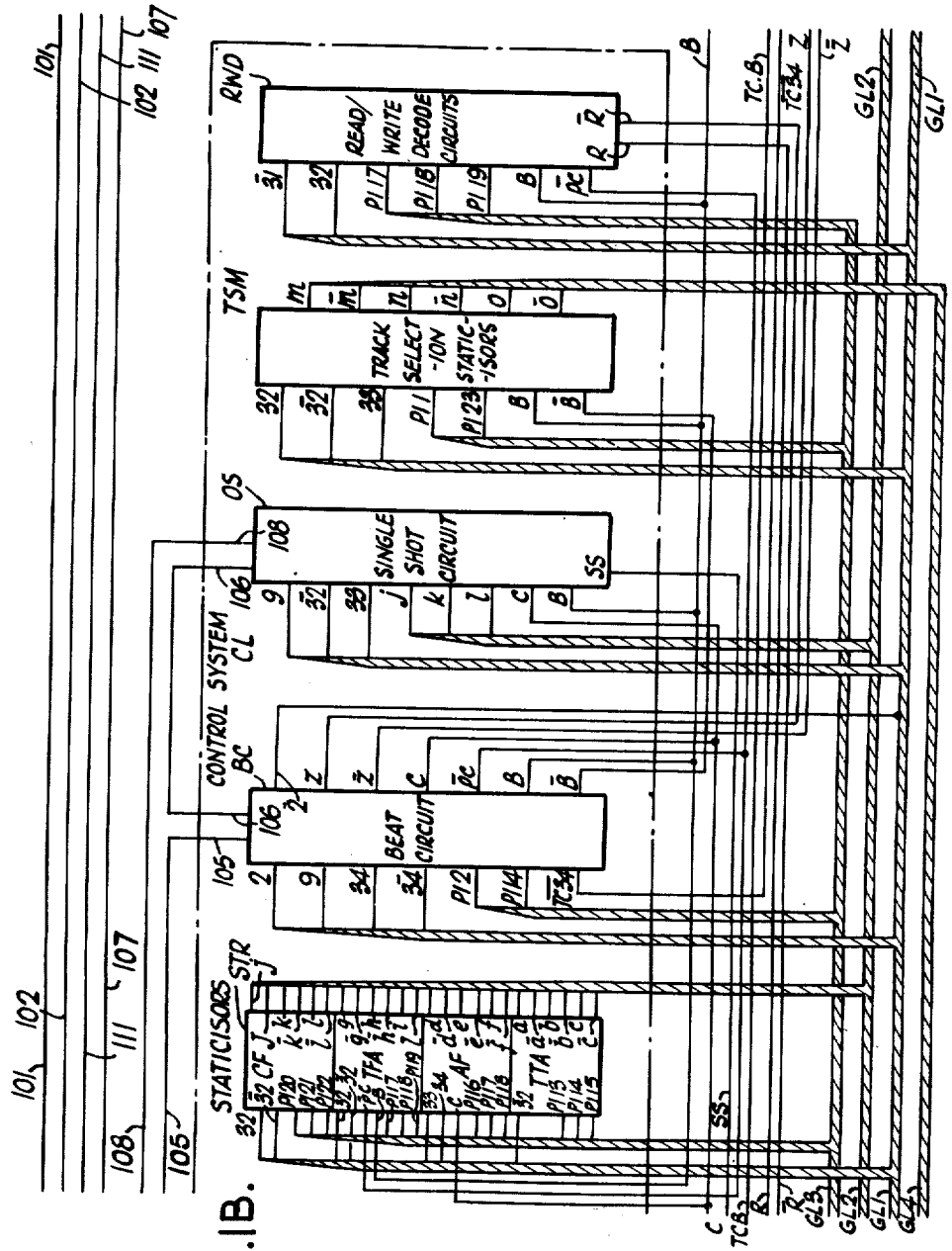

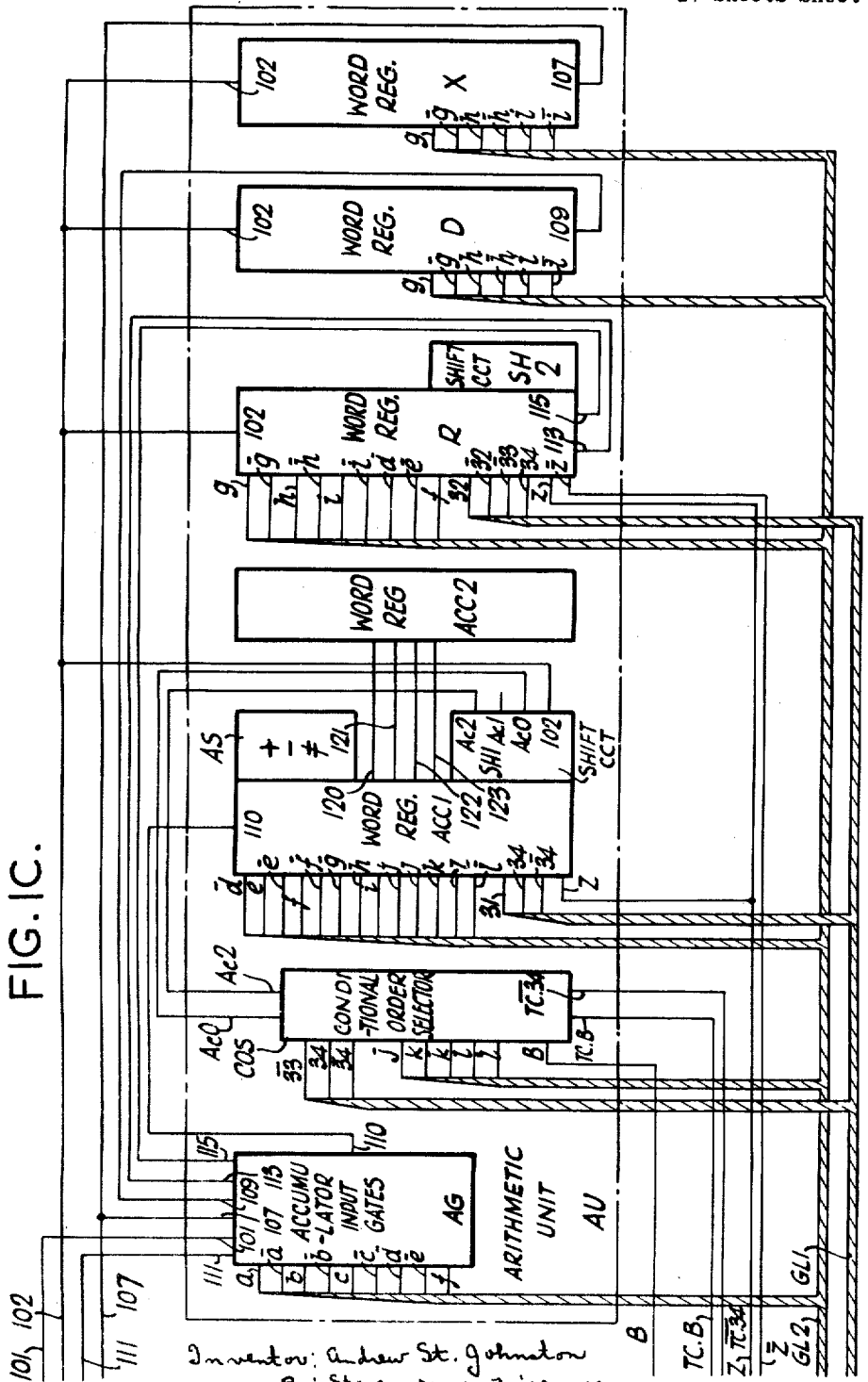

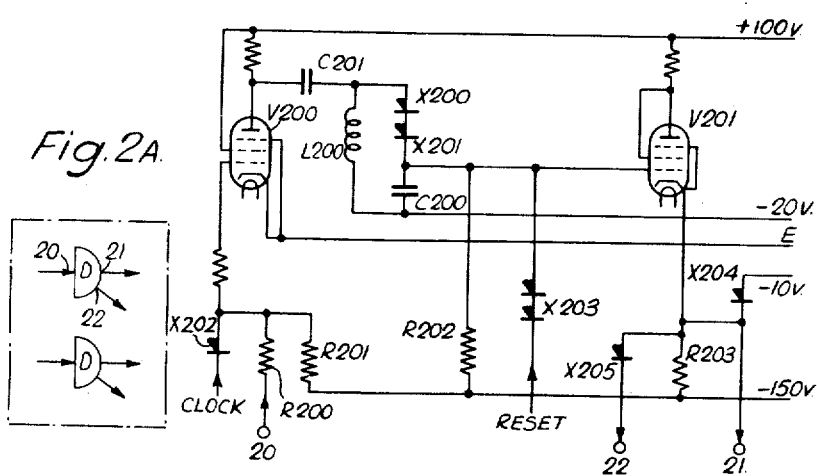
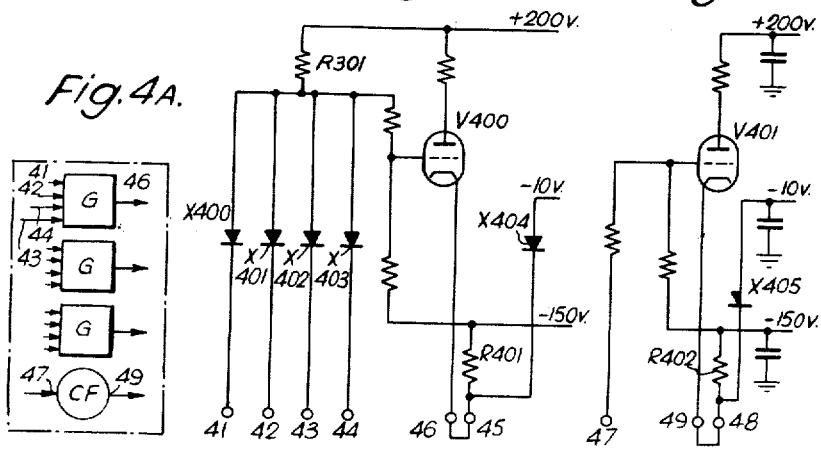

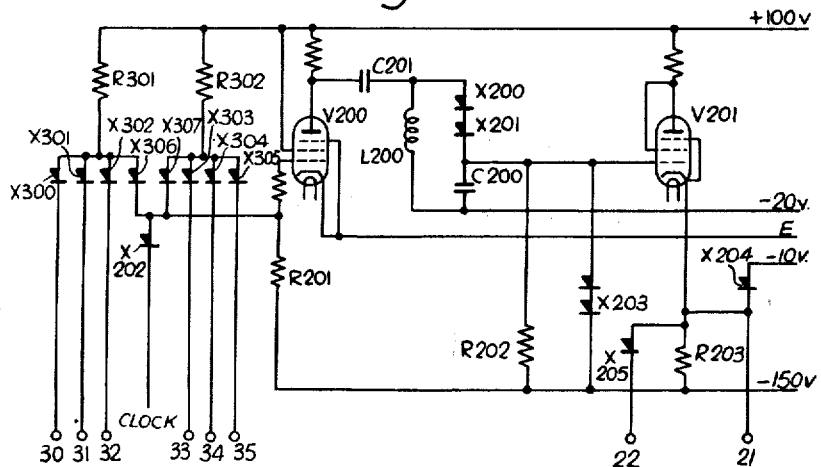
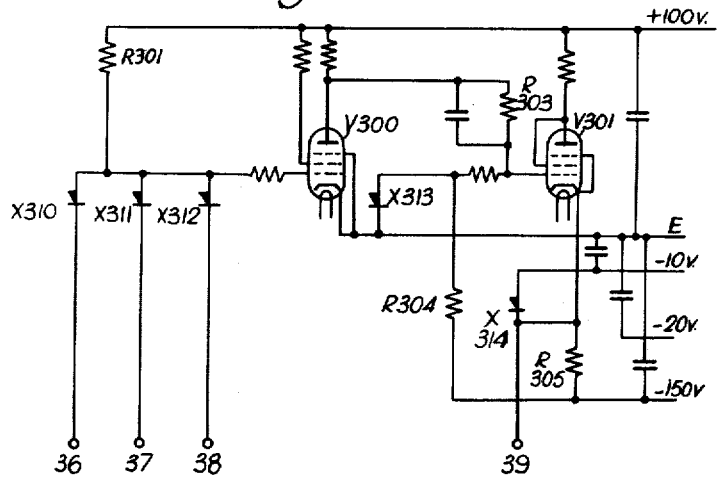
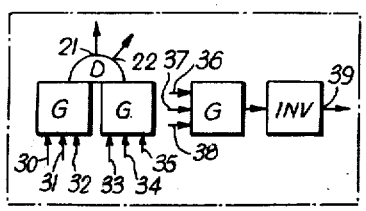

July 21, 1959 — A. ST. JOHNSTON — 2,895,671
ELECTRONIC DIGITAL COMPUTING MACHINES
Filed March 23, 1954 — 17 Sheets-Sheet 6
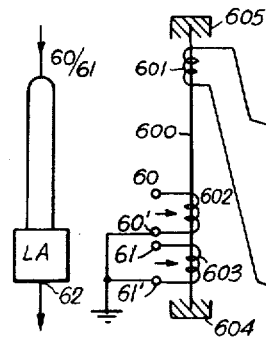
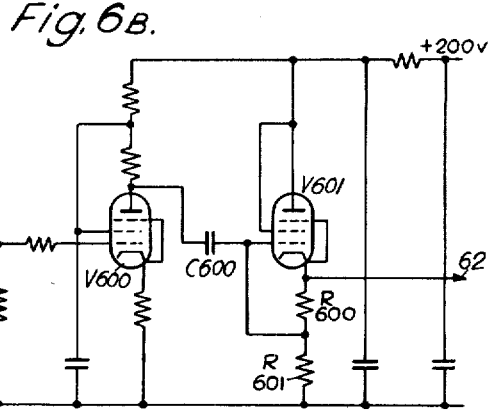
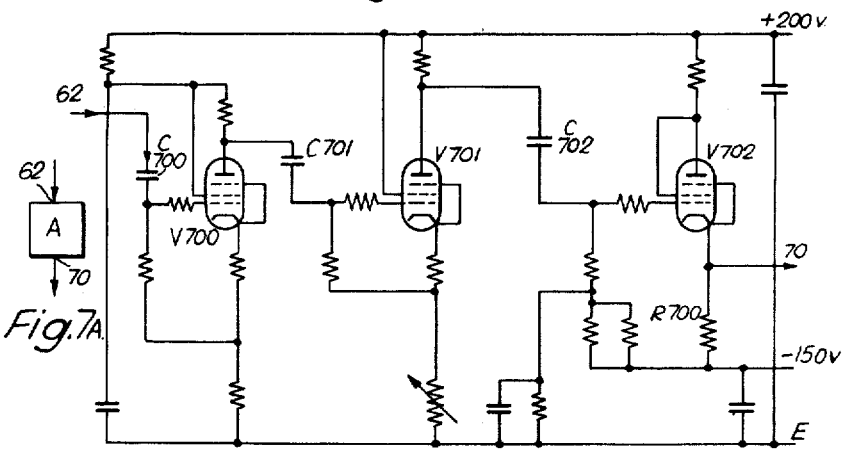
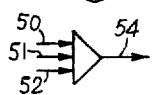
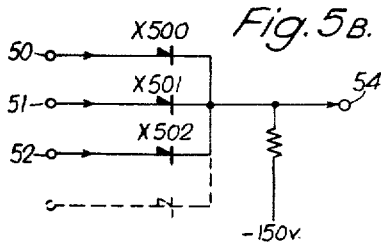
INVENTOR
ANDREW ST. JOHNSTON
ATTORNEYS

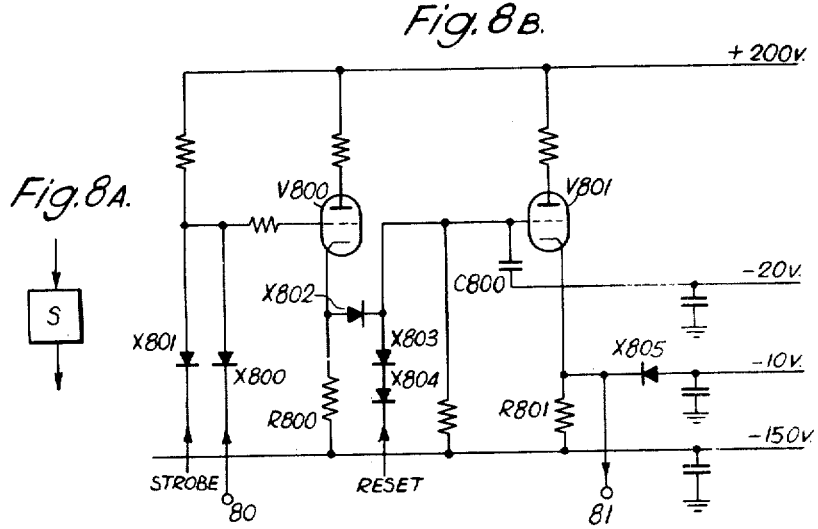
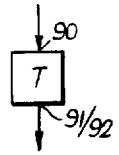
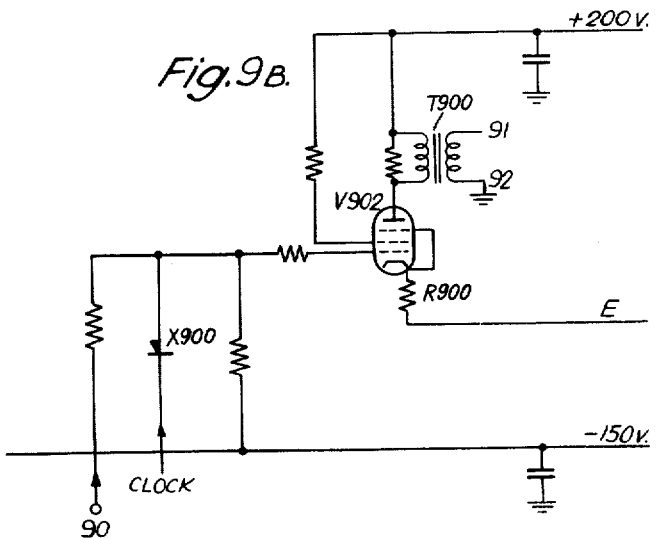

July 21, 1959  A. ST. JOHNSTON  2,895,671
ELECTRONIC DIGITAL COMPUTING MACHINES
Filed March 23, 1954  17 Sheets-Sheet 8
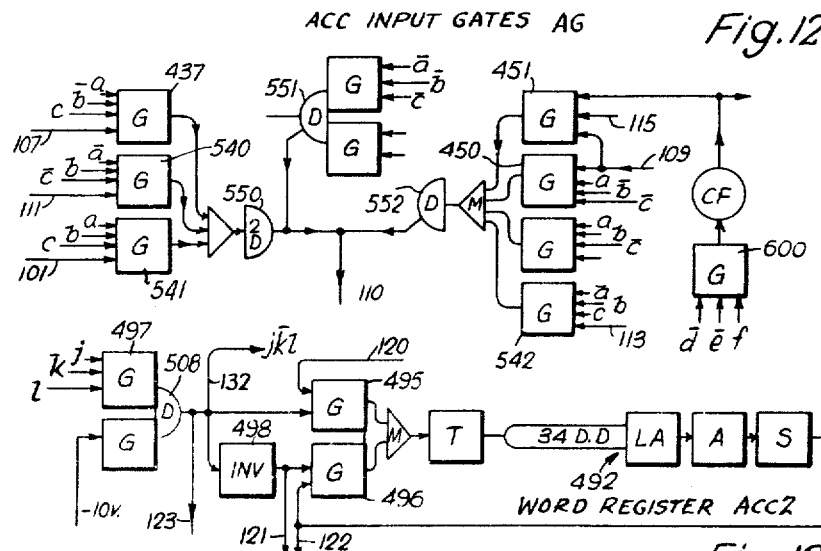
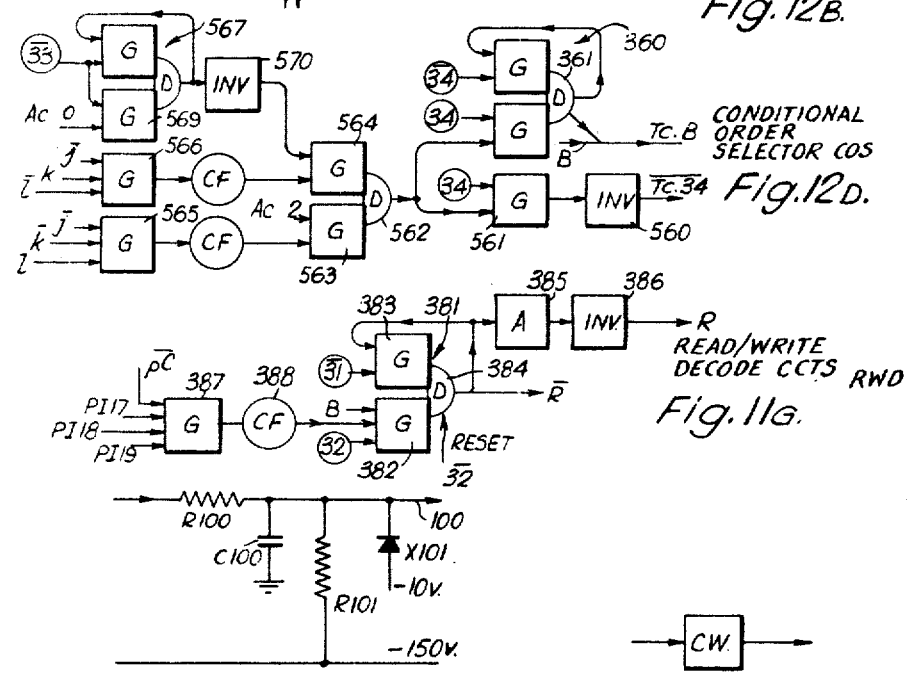
INVENTOR
ANDREW ST. JOHNSTON

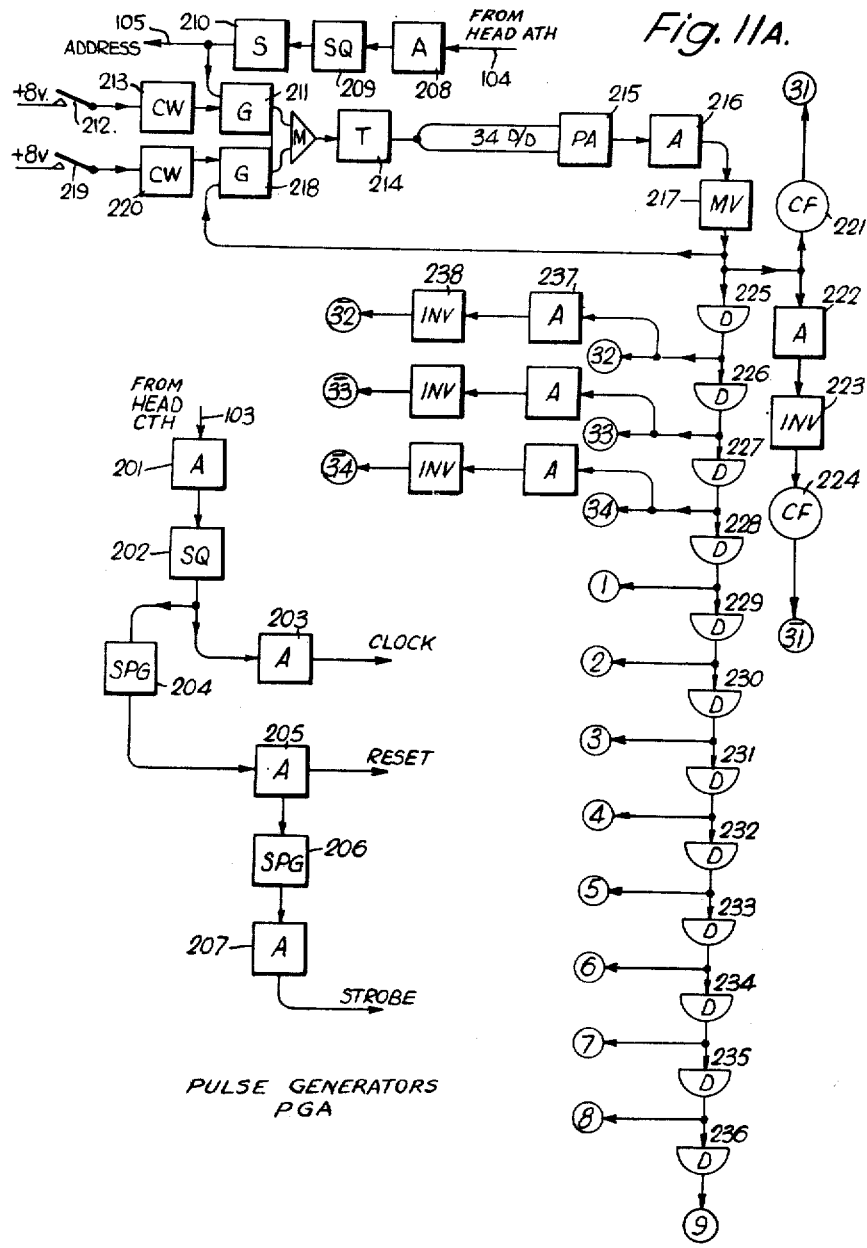

July 21, 1959     A. ST. JOHNSTON     2,895,671
ELECTRONIC DIGITAL COMPUTING MACHINES
Filed March 23, 1954     17 Sheets-Sheet 10
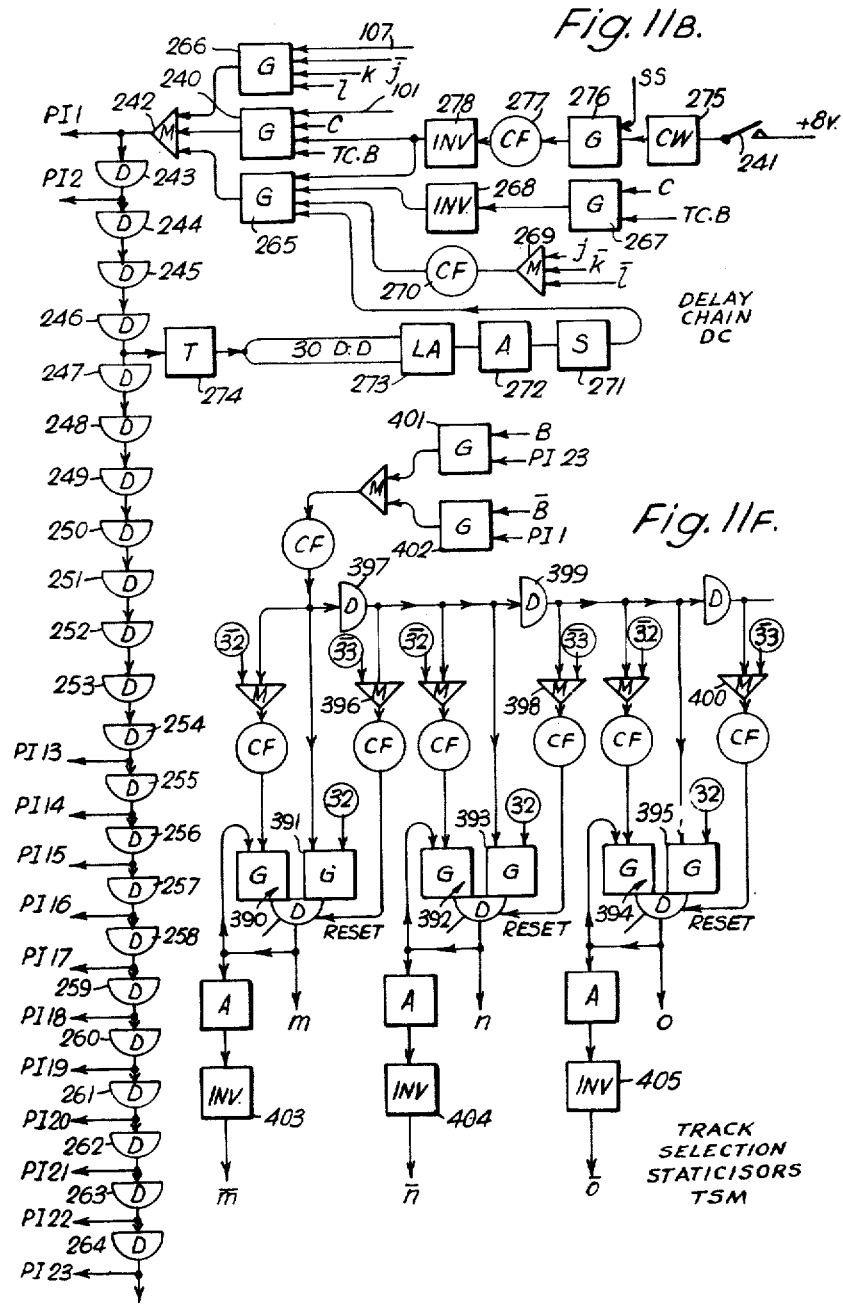
INVENTOR
ANDREW ST. JOHNSTON
ATTORNEYS July 21, 1959 A. ST. JOHNSTON 2,895,671
ELECTRONIC DIGITAL COMPUTING MACHINES
Filed March 23, 1954 17 Sheets-Sheet 11

INVENTOR
ANDREW ST. JOHNSTON
ATTORNEYS

July 21, 1959  A. ST. JOHNSTON  2,895,671
ELECTRONIC DIGITAL COMPUTING MACHINES
Filed March 23, 1954  17 Sheets-Sheet 12
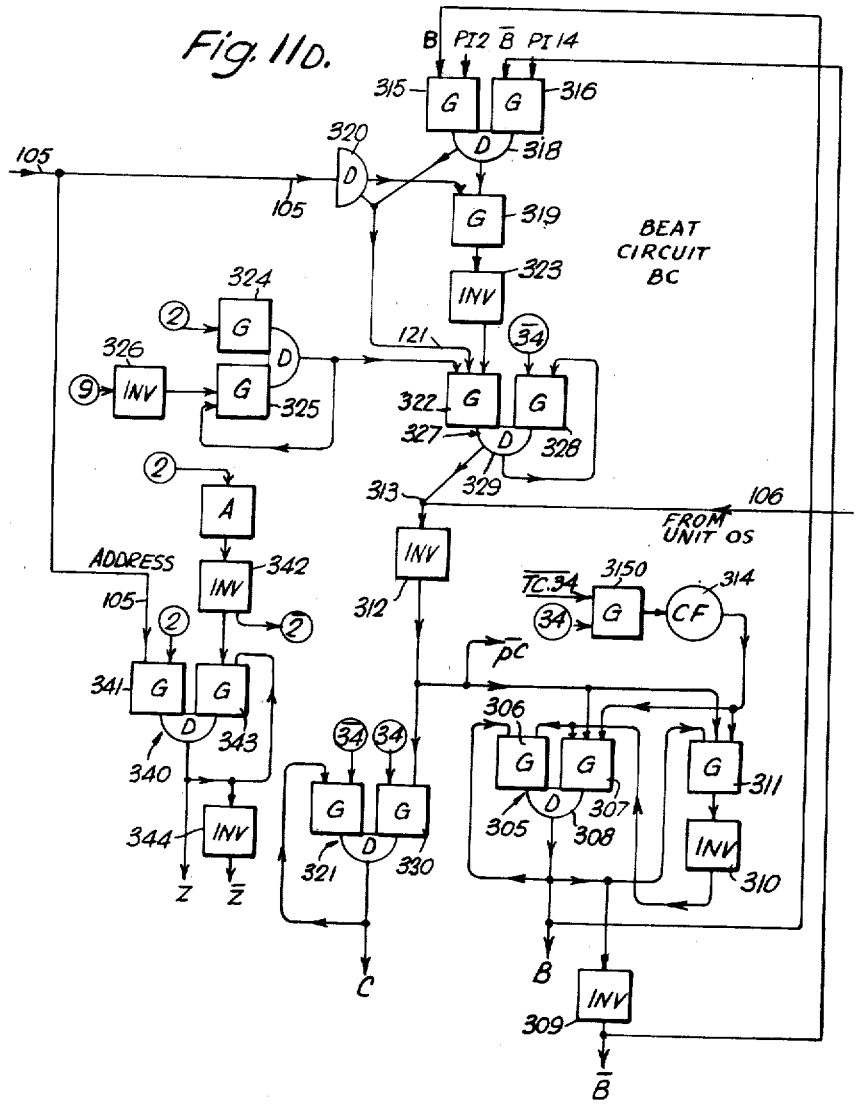
INVENTOR
ANDREW ST. JOHNSTON
BY Stevens, Davis,
Miller & Mosher
ATTORNEYS

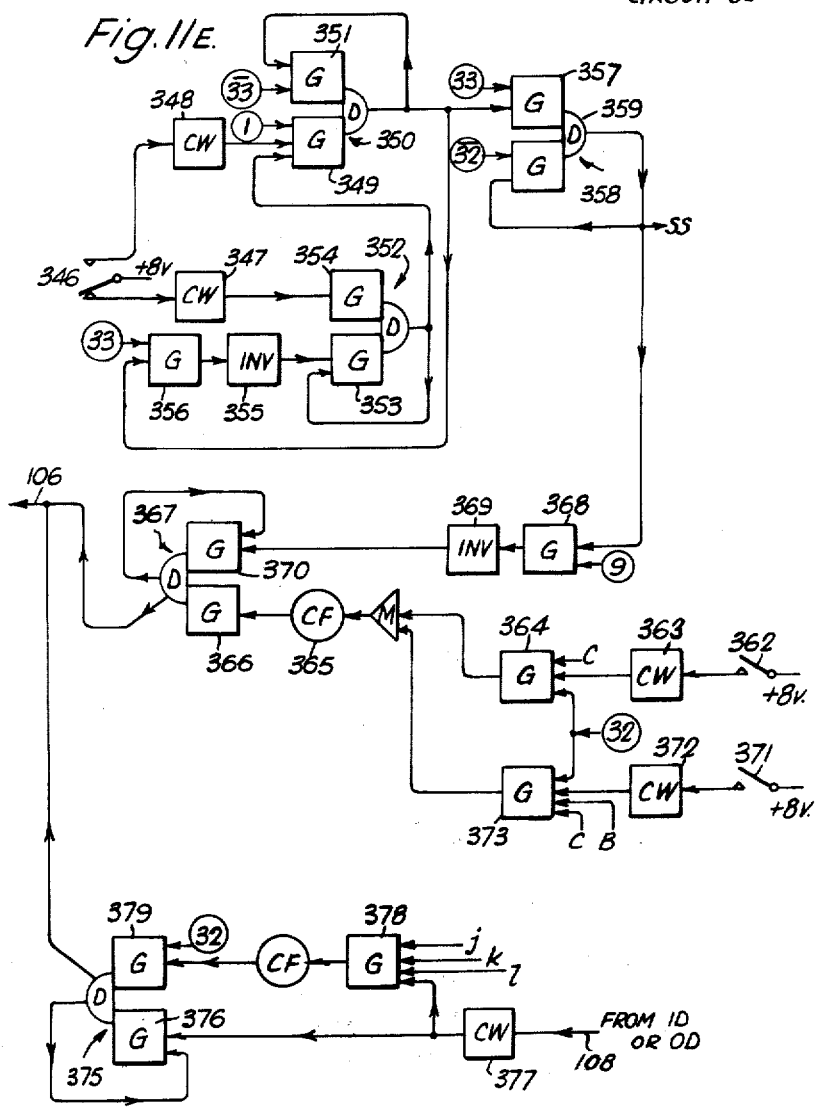

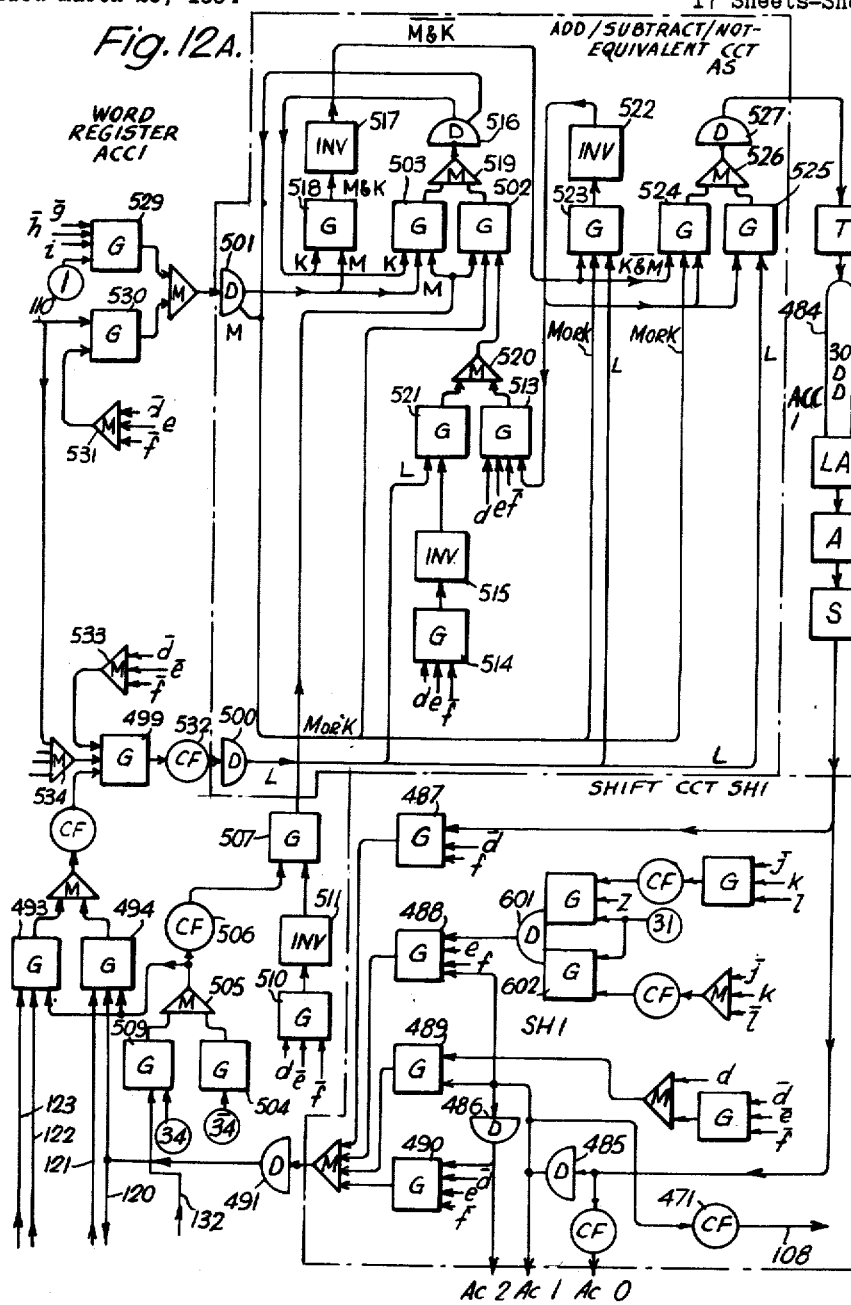

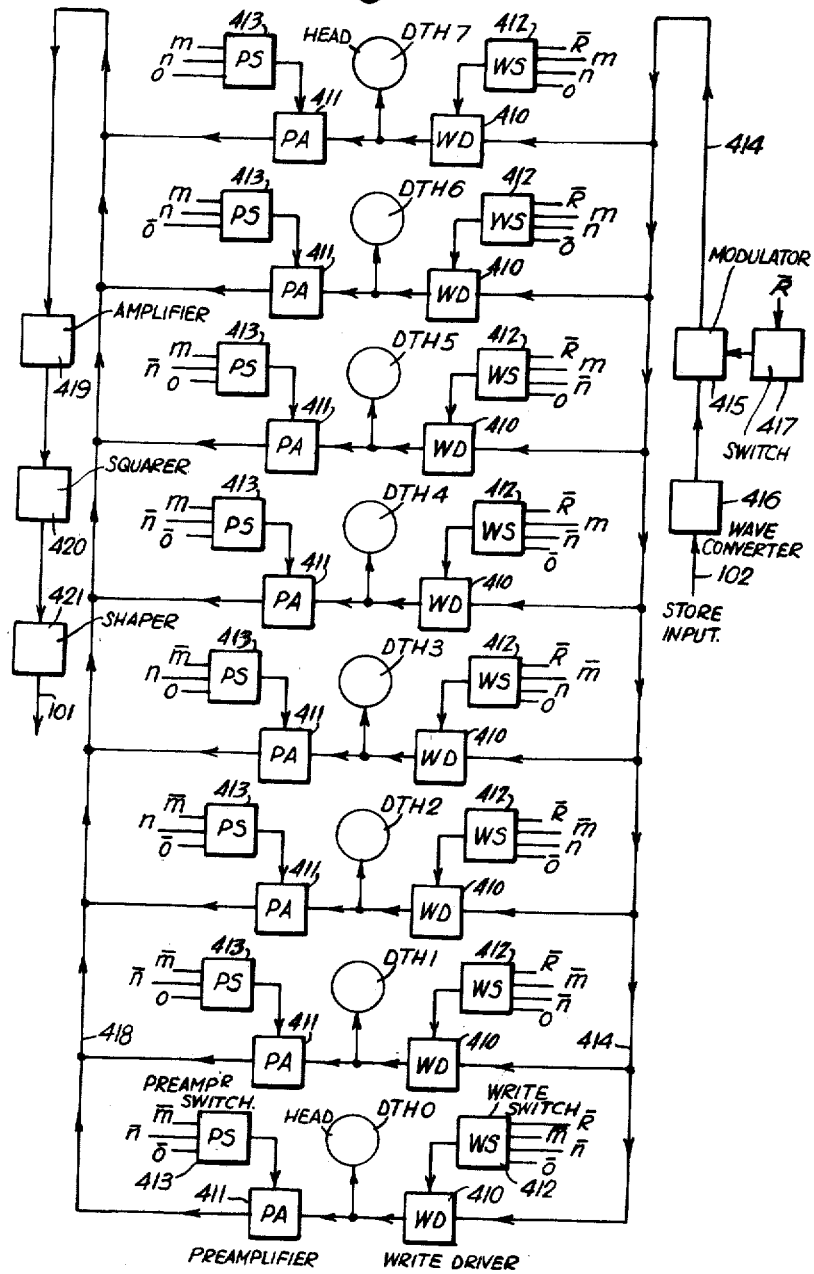

July 21, 1959
A. ST. JOHNSTON
2,895,671
ELECTRONIC DIGITAL COMPUTING MACHINES
Filed March 23, 1954
17 Sheets-Sheet 17
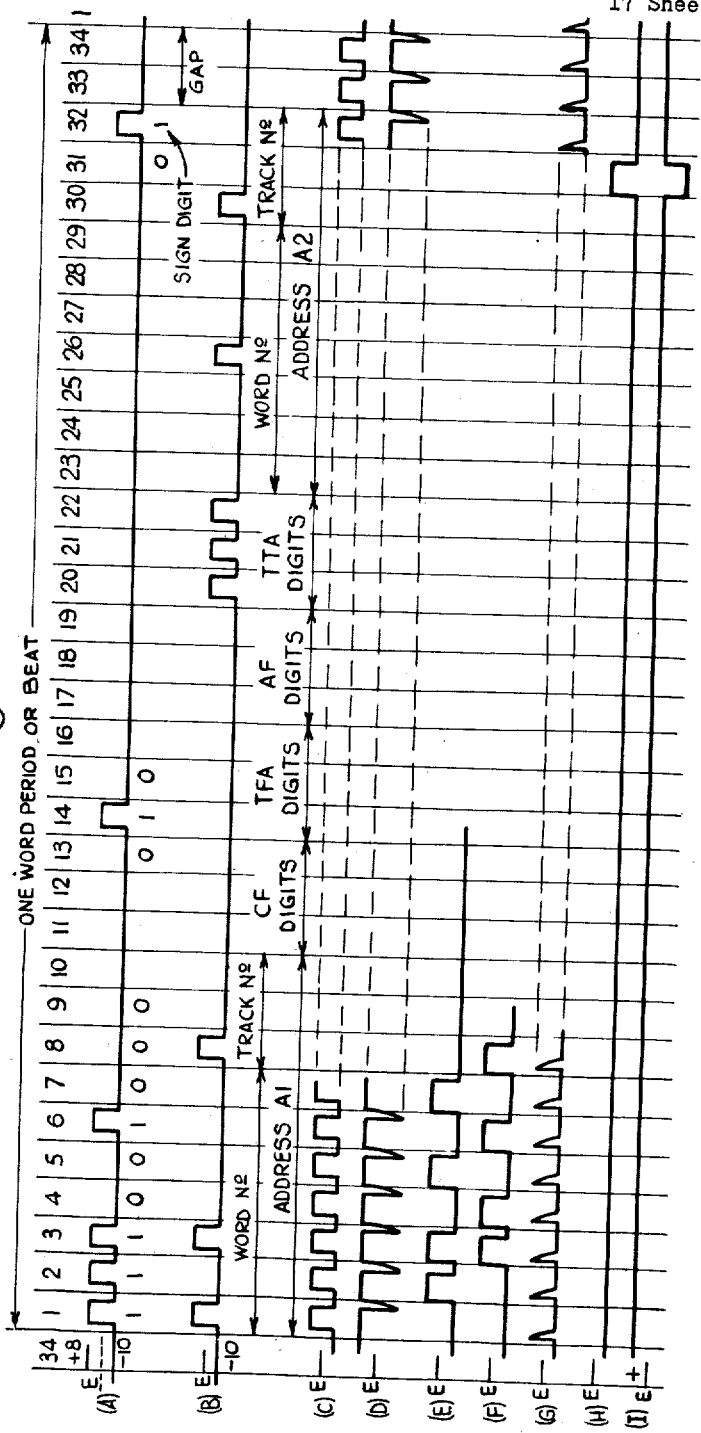
INVENTOR
ANDREW ST. JOHNSTON

United States Patent Office 2,895,671
Patented July 21, 1959

2,895,671

ELECTRONIC DIGITAL COMPUTING MACHINES

Andrew St. Johnston, Buntingford, England, assignor, by mesne assignments, to International Business Machines Corporation, New York, N.Y., a corporation of New York Application March 23, 1954, Serial No. 418,104

Claims priority, application Great Britain March 24, 1953

6 Claims. (Cl. 235—157)

This invention relates to electronic digital computing machines and is more particularly concerned with machines operating in the serial mode with number and instruction words signalled as electric pulse trains. The invention is particularly, although by no means exclusively, adapted to machines utilising word-length and other registers employing magneto-striction delay lines of the kind described in the specification of copending U.S.A. Patent Application Serial No. 303,552, filed August 9, 1952, by R. Millership, now Patent No. 2,790,160.

One object of the invention is to provide an improved control system for such machines which utilise instructions each containing a first and a second storage address location defining signal and in accordance therewith means are provided whereby the machine can be caused to operate to utilise first said first storage address location defining signal and subsequently said second storage address location defining signal of each instruction or alternatively to utilise only said first storage address location defining signal of such instruction.

In order that the invention may be more readily understood one embodiment thereof will now be described with reference to the accompanying drawings in which:

Figs. 1A, 1B and 1C form a composite block schematic diagram of the principal elements of an electronic computing machine embodying the present invention and show the signal and control interconnections between the various parts.

Figs. 2A, 3A and 4A show in symbolic form three different types of standard unit from which the machine is largely built up while Figs. 2B, 3B, 3C, 4B, 4C are detailed circuit diagrams of different parts of such units.

Fig. 5A shows the symbol used for a mixer device and Fig. 5B the circuit thereof.

Figs. 6A, 7A, 8A and 9A illustrate in symbolic form the units which make up a word length register within the machine while Figs. 6B, 7B, 8B and 9B are detailed circuit diagrams of such units.

Fig. 10A shows the symbol and Fig. 10B the circuit details of another part of the machine.

Figs. 11A, 11B, 11C, 11D, 11E, 11F and 11G show in block schematic form the detailed arrangements of the different parts of the control unit of the machine.

Figs. 12A, 12B, 12C, 12D and 12F show in similar block schematic form the arrangements of the different parts of the arithmetic unit of the machine.

Fig. 13 shows the reading and writing circuits of the machine, while

Fig. 14 shows a number of electric waveform diagrams.

The machine to be described operates in the serial mode and in the binary scale of notation with a digit signalling period of 3 micro-seconds and a beat period of 102 micro-seconds to accommodate a word length of 32 digits plus a 2-digit period gap between adjacent beat or word signalling times. As illustrated in Fig. 14, diagram (A), the first 32 digit periods 1, 2 . . . 32 of each beat constitute the active digit periods and the remaining two periods, 33 and 34, the aforesaid gap. Unless otherwise stated, the active or operational potential level of the various electric pulse and other control waveforms is positive-going (usually approximately +8 v.) relative to a resting level which is negative to earth (usually approximately —10 v.). Thus a gate circuit, for example, will be opened or made conductive when each of its various operative inputs is positive-going and will be closed or made non-conductive when any one or more of such operative inputs is/are at negative level.

Both numbers and instructions are signalled by similar 32-digit word pulse trains wherein the binary value "1" is indicated by a positive-going pulse in any required digit period and the binary value "0" by the absence of any such pulse from such period, the signal waveform then remaining at its negative resting level. In number word signals the various signalling digit periods 1, 2 . . . 32 represent progressively increased binary powers such as $2^0$, $2^1$, $2^2$ . . . in the usual way but in instruction words the various digit periods have the significance indicated in Fig. 14, diagram (B) as follows:

Digits 1–10, first address number (A1)
Digits 11–13, control function (CF)
Digits 14–16, transfer from accumulator (TFA)
Digits 17–19, accumulator function (AF)
Digits 20–22, transfer to accumulator (TTA)
Digits 23–32, second address number (A2)

Figure 1A:
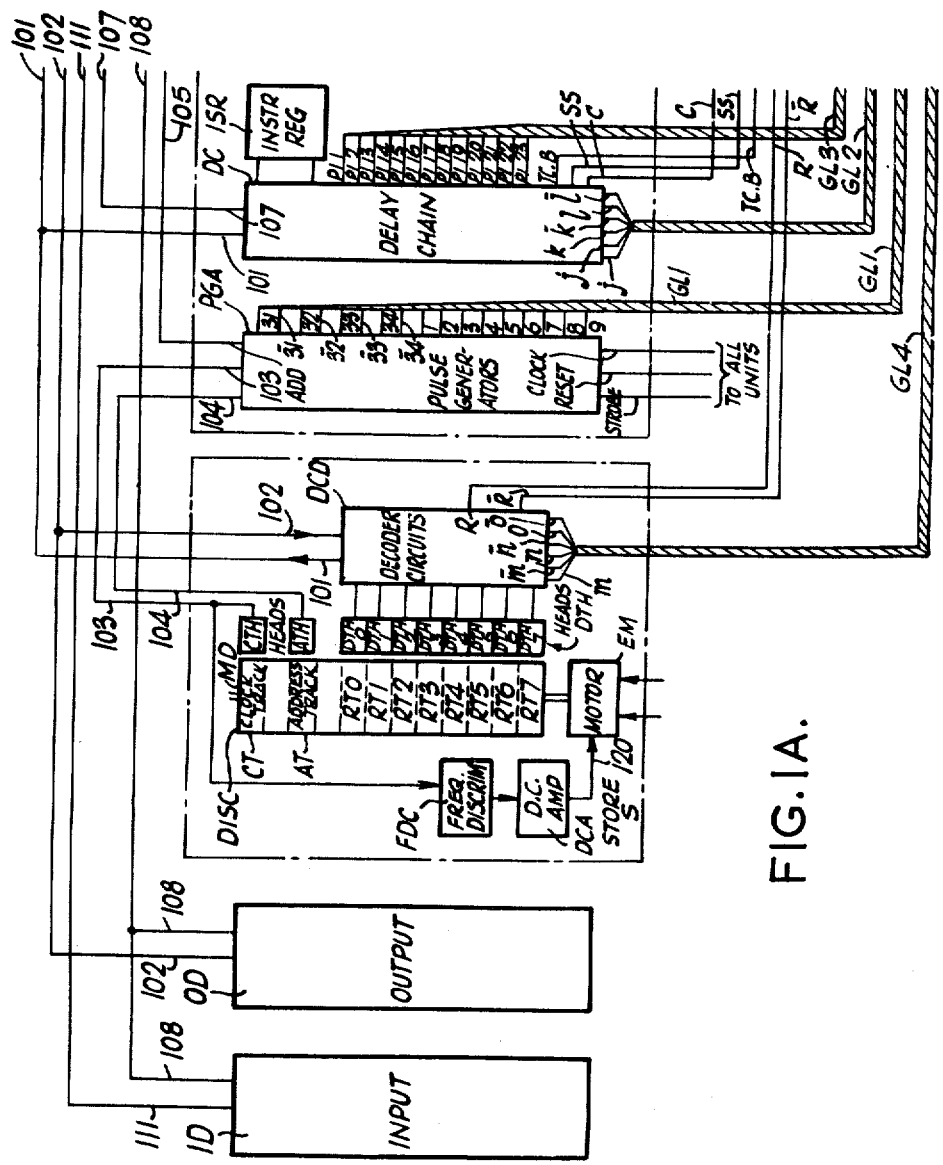

Referring now to the block schematic diagram of Figs. 1A, 1B and 1C, the machine includes a store S for holding both number and instruction words, a control system CL for receiving signals including instruction words from the store S and providing therefrom a series of appropriate timing and control waveforms, an arithmetic unit AU which includes a number of word storage registers, a computing circuit and other ancillary parts for dealing with number word signals supplied thereto and input and output devices ID, OD by which data may be fed into and withdrawn from the machine. The last-mentioned input and output devices ID, OD can follow any of the now well known types by which input data can be supplied from perforated tape through the intermediary of a tape reader and by which output data can be derived by the operation of an electric typewriter: As these parts are in no way concerned with the present invention they will not be further described.

The store S comprises a magnitude disc or drum recording device MD providing a plurality of separate tracks each having a plurality of separate word storage locations and a decoder circuit DCD for selecting any one of the available tracks for use either in reading out from or writing into the store. This circuit DCD has a signal output lead 101 for supplying word-representing pulse signal trains to unit DC of the control system CL and to unit AG of the arithmetic unit AU. It also has a signal input lead 102 by which word-representing signal pulse trains derived from units ACC1, R, D and X of the arithmetic unit AU may be recorded in said recording device MD. Further output leads 103, 104 supply respectively a continuous timing signal and a series of address indicating signals each occurring immediately prior to the period of availability of each word storage location. These signals are supplied to unit PGA of the control system CL.

The control system CL comprises a pulse generator unit PGA which is described in greater detail later with reference to Fig. 11A. This unit is supplied with the aforesaid timing and address signals from the store S over leads 103, 104. The address signals are supplied therefrom, after suitable amplification and shaping, to a subsequent unit BC of the control system over lead 105 and are also used to provide a series of digit timing pulse waveforms 31, $\overline{31}$, 32, $\overline{32}$, 33, $\overline{33}$, 34, $\overline{34}$, 1, 2, 3, 4, 5, 6, 7, 8 and 9 whose forms will be described in greater detail later and which are made available throughout the machine by means of bus-bars which are shown grouped together in a common multiple conductor supply cable GL1. The timing signals are used to derive a continuous series of timing waveforms known as the "Clock," "Reset" and "Strobe" waveforms which are also applied to all units of the machine.

The control system CL also includes a delay chain DC with which is associated an instruction register ISR for retaining an applied instruction word signal until it has been obeyed. These units are described in greater detail later with reference to Fig. 11B. The delay chain is supplied with output signals from the store S over lead 101 and also with output signals from unit X of the arithmetic unit AU over lead 107 and therefrom serves to provide a series of signal outputs, each at different relative timings and referred to respectively as the PI 1, PI 2, PI 13, PI 14, PI 15, PI 16, PI 17, PI 18, PI 19, PI 20, PI 21, PI 22 and PI 23 waveforms. These PI 1 ... PI 23 waveforms are likewise made available to units STR, BC, TSM and RWD of the control system over separate bus-bars which are shown grouped together as a multiple conductor cable GL3.

The control system also includes a staticisor unit STR whose form will be described in greater detail later with reference to Fig. 11C. This unit comprises four separate groups of staticisors, each group having three separate staticisor circuits, for dealing respectively with each of the aforementioned three-digit groups CF, TFA, AF and TTA of an instruction word. These staticisor groups are supplied with selected ones of the difference digit timing pulse waveforms in cable GL1 and with selected ones of the delayed signal outputs of cable GL3 as well as a plurality of other controlling waveform inputs from other elements of the machine, as described later, and serve to provide four separate groups of function control waveforms whose character is dependent upon the configuration of the related CF, TFA, AF and TTA digits of the current instruction word supplied to the control system. These groups of function control waveforms comprise the CF group of the $j, \bar{j}, k, \bar{k}, l, \bar{l}$ waveforms, the TFA groups of the $g, \bar{g}, h, \bar{h}, i, \bar{i}$ waveforms, the AF group of the $d, \bar{d}, e, \bar{e}, f, \bar{f}$ waveforms and the TTA group of the $a, \bar{a}, b, \bar{b}, c, \bar{c}$ waveforms. All of these waveforms are similarly made available to units DC OS and RWD of the control system CL and units AG, COS, ACC1, R, D and X of the arithmetic unit AU by way of bus-bars shown as a multiple conductor cable GL2.

The control system CL further includes a beat circuit BC which will be described in greater detail later with reference to Fig. 11D and which includes a coincidence testing circuit for comparing the address signal provided over lead 105 from the pulse generator unit PGA with the first address number signal A1 or the second address number signal A2 included in an instruction and supplied from the outputs PI 2 and PI 14 from the delay chain DC. Upon the existence of the required coincidence, the circuit provides further control waveforms defining the various operative beats of the machine rhythm and including the $z, \bar{z}, C, \overline{pc}, B$ and $\bar{B}$ waveforms. This beat circuit BC is supplied with a number of digit pulse timing waveforms from the cable GL1 and the $\overline{TC.B}$ waveform from unit COS of the arithmetic unit AU as well as the PI 2 and PI 14 signals from the cable GL3 and receives also a control signal over lead 106 from a further unit known as the single shot circuit OS which provides, upon the operation of suitable manual control keys, for the operation of the machine to deal only with one single instruction instead of the usual continuous and automatic operating rhythm. This single shot circuit OS, which is described in greater detail later with reference to Fig. 11E, is supplied with certain of the digit pulse timing waveforms from the cable GL1, with certain function control waveforms from the cable GL2 and with the C and B waveforms from circuit BC as well as a further control potential over lead 108 derived from the input or output units ID, OD.

The control system CL also comprises a further group of three staticisors known as the track selection staticisors TSM and described in greater detail later with reference to Fig. 11F. This group of staticisors is concerned with the selection of the required recording track of the device MD and provides a further group of six track selection waveforms $m, \bar{m}, n, \bar{n}, o, \bar{o}$ which are made available in the store S over the multiple conductor cable GL4. This unit TSM is supplied with certain of the digit pulse timing waveforms in cable GL1 and with the PI 1 and PI 23 signal waveforms in cable GL3 as well as the B and $\bar{B}$ waveforms from circuit BC.

The control system CL finally comprises a unit RWD described in greater detail later with reference to Fig. 11G and consisting of read/write decode circuits for providing output control waveforms R, and $\bar{R}$ which are supplied ot the decoder circuit DCD of the store S for determining whether signals are to be read out from or are to be written into the device MD. This read/write decode circuit RWD is supplied with certain of the digit pulse timing waveforms of cable GL1, with certain of the signal waveforms of cable GL3 and with the B and $\overline{pc}$ control waveforms from circuit BC.

The arithmetic unit AU comprises an accumulator input gate unit AG described in detail later with reference to Fig. 12F and by which any required one of a number of alternative signal inputs may be routed to a common output lead 110. The signal inputs available are those on lead 111 from the input device ID, on lead 101 from the store S, on lead 107 from a word register X of the arithmetic unit, on lead 109 from another word register D of the arithmetic unit or on one or the other of leads 113, 115 from a further word register R. This accumulator input gate unit AG is controlled by certain of the function control waveforms of the cable GL2.

The output on lead 110 from the accumulator input gate unit AG is applied to a first word register ACC1 with which is associated a computing circuit AS adapted to perform the functions of either addition or subtraction with, or the determination of non-equivalence between, a first number representing signal held in the register ACC1 and a further number representing signal applied thereto. This register also has associated therewith a first shift circuit SH1 by which an output signal train may be derived in any one of three different relative timings known respectively as the Ac0, Ac1 and Ac2 outputs. These elements will be described in detail later with reference to Fig. 12A. A further output, having a timing identical with that of the Ac1 output, is fed to the lead 102 connected to the further word registers R, D and X and the store S. The operation of this word register ACC1 is controlled by a selection of the function control waveforms of cable GL2, by certain of the digit pulse timing waveforms on cable GL1 and by a further control waveform $z$ derived from the beat circuit BC of the control system CL. Directly associated with this word register ACC1 is a second word register ACC2 which can, effectively, be included as part of the first register ACC1 by way of interconnecting leads 120, 121, 122 and 123.

The further word register R has associated therewith a second shift circuit SH2 by which an output word signal, at one or other of two different timings, can be provided over the output leads 113 and 115 leading to the accumulator gate unit AG. The signal input to this register is derived over lead 102 as already stated. The operation of this word register is controlled by a selection of the function control waveforms of the cable GL2, by a number of the digit pulse timing waveforms in cable GL1 and by the $z$ and $\bar{z}$ waveforms from beat circuit BC of the control system.

The further word registers D and X are generally similar to the register R except that they are not provided with a shift circuit; each has a signal input from lead 102 as already stated and serves to provide respectively outputs over leads 109 and 107 to the accumulator gate unit AG. The control of each of these D and X registers is derived from selected function control signals in cable GL2.

The arithmetic unit finally includes a conditional order selector COS by which the further operation of the machine along a chosen one of two alternative series of programme steps can be made conditional upon a test operation effected upon a partial answer number which has previously been obtained. This conditional order selector COS is supplied with the differently timed output signals Ac0, Ac2 from the word register ACC1 and with selected digit pulse timing and function control waveforms from the cables GL1 and GL2. In addition, it is supplied with the B waveform from beat circuit BC of the control system CL and provides two further control waveforms, known as the TC.B and $\overline{\text{TC.34}}$ waveforms, which are applied to the delay chain DC and the beat circuit BC respectively.

The machine is largely made up of a number of separate plug-in units of three types which are described in detail in U.S.A. patent specification Serial No. 394,442, now abandoned. These three units are shown respectively in Figs. 2A, 3A and 4A and comprise, firstly a unit consisting of two delay circuits each having a delay time of one digit period (hereafter called a unit delay), shown in Fig. 2A; secondly a unit consisting of a unit delay fed with the mixed or combined outputs from two multiple input coincidence gate circuits (hereafter called a gate), and, separately, an inverter fed with the output from a gate, shown in Fig. 3A; and thirdly, a unit having three separate gates and at least one separate cathode follower stage, shown in Fig. 4A.

Before dealing in greater detail with the construction and manner of operation of the various units of the store S, control system CL and arithmetic unit AU referred to above, a description will first be given of a preferred form of each of the symbols used in the more detailed drawing Figs. 11A, 11B, 11C, 11D, 11E, 11F, 11G, 12A, 12B, 12C, 12D, 12E and 13.

UNIT DELAY DEVICE

Referring particularly to Fig. 2A, the symbol which is shown twice within the chain-dotted rectangle will hereafter be used to indicate a unit delay. Such unit delay has a single signal input terminal 20 and two alternative signal output terminals 21, 22 both of which provide similar output signals.

Fig. 2B shows the detailed circuit arrangement of such unit delay. This circuit comprises a pentode valve V200 which has its anode coupled through capacitor C201 to the control grid of a second pentode valve V201 by way of a closed loop containing, in series, an inductance L200, a capacitor C200 and two germanium rectifiers X200 and X201. Valve V201 is arranged as a cathode follower. The signal input to the control grid of valve V200 is applied from input terminal 20 through resistor R200. Germanium crystal rectifier X202 is connected between the control grid of valve V200 and a bus-bar (not shown) carrying the "Clock" pulse waveform which is shown in Fig. 14, diagram (C) and which is provided, as already stated, by the pulse generator unit PGA of the control system CL (Fig. 1B). Capacitor C200 and control grid of valve V201 are connected through a pair of germanium rectifiers X203 to a further bus-bar (not shown) carrying the "Reset" pulse waveform which is shown in Fig. 14, diagram (D) and which is also derived from said pulse generator unit PGA (Fig. 1B).

The control grid of valve V201 is also connected through resistor R202 to source of negative potential −150 v. while the control grid of valve V200 is likewise connected to the same source through resistor R201. The cathode of valve V201 is connected also to such source −150 v. through resistor R203 and is additionally connected directly to output terminal 21 and through blocking rectifier X205 to alternative output terminal 22. Rectifier X204 connected between the cathode of valve V201 and source of negative potential −10 v. acts as a clamp diode to prevent the cathode of that valve falling below −10 v. potential.

In the operation of this arrangement the arrival of a positive "clock" pulse at the control grid of valve V200 during the time when a positive signal pulse is present through input terminal 20 produces a "ring" in the inductance L200. Whilst the valve is conducting a current builds up in the inductance but as the resulting voltage across the latter is negative-going, rectifiers X200, X201 prevent discharge of the capacitor C200. However, when the valve again ceases to conduct, at the end of the positive "clock" pulse, the continuance of the current in the inductance makes the voltages across the latter positive-going so that this current then charges capacitor C200 through rectifiers X200, X201.

The potential at the control grid of valve V201, which is normally held down, accordingly rises to initiate a positive-going output pulse at its cathode. This output pulse persists until capacitor C200 is discharged at the end of the next following "clock" pulse period by the appropriate "Reset" pulse, Fig. 14, diagram (D), applied through rectifier X203. It will be appreciated that there was also a "Reset" pulse applied at the time just after the valve V200 ceased to conduct, i.e. when the current in the inductance L200 was about to charge the capacitor C200. However, this merely had the effect of deferring the initiation of the charging of the capacitor until after such first "Reset" pulse had terminated, the current in the inductance L200 flowing in the meantime through the rectifiers X200, X201, and X203.

The voltage waveform appearing at the output terminals 21, 22 is shown in Fig. 14, diagram (F) relative to an input pulse train as shown in Fig. 14, diagram (E).

Referring now to Fig. 3A, that part of the unit shown in symbolic form therein lying at the left hand side comprises two coincidence gates G whose respective outputs are combined and applied to a unit delay D. Fig. 3B shows the circuit of such a combined double gate and delay unit. The first gate G is of conventional form constituted by rectifiers X300, X301 and X302 connected by one terminal respectively to input terminals 30, 31 and 32 and having their other terminals interconnected and joined by way of resistor R301 to the positive supply source +100 v. and also by way of rectifier X306 to the control grid of valve V200. The other gate G is similarly constituted by rectifiers X303, X304 and X305 having one of their terminals connected respectively to input terminals 33, 34 and 35 and having their opposite terminals interconnected and joined by way of resistor R302 to the positive supply source +100 v. Such common connection is also joined by way of rectifier X307 to the control grid of valve V200.

The unit delay is constituted by valves V200 and V201 and associated parts in identical manner to that already described in connection with Fig. 2B. In view of the identity similar reference numerals have been given and the unit delay will not be further described.

In the operation of such device, a positive-going potential must be present on each of the input terminals 30, 31 and 32 simultaneously before any corresponding positive-going potential is applied to the control grid of valve V200. Similarly a positive-potential must be present at each of the input terminals 33, 34 and 35 before any corresponding positive potential is applied to the control grid of valve V200. A positive-going output from either gate, however, is effective upon the valve V200 in the usual way of a buffer or "or" circuit. Upon the application of such positive input to the control grid of valve V200 the unit delay functions in a manner identical with that already described to provide a corresponding positive digit pulse output at output terminals 21 or 22 in the digit period immediately following that in which the coincident inputs at terminals 30, 31, 32 and/or terminals 33, 34, 35 occurred.

If less than three inputs are required to any one gate or if only one gate is needed, the unused inputs are left unconnected.

INVERTER DEVICE

The other part of the unit illustrated by the symbols lying at the right hand side in Fig. 3A comprises a gate circuit G followed by an inverter circuit INV. Fig. 3C shows the circuit arrangements for such combination and comprises rectifiers X310, X311 and X312 connected between input terminals 36, 37 and 38 and the control grid of valve V300 and by way of resistor R301 to the positive supply source +100 v. to form a gate circuit similar to those described with reference to Fig. 3B. The anode output of the valve V300 is applied by way of potentiometer network of resistors R303, R304 to the control grid of a cathode follower valve V301 arranged with a cathode load resistor R305 connected between the valve cathode and the source of negative potential —150 v. and with an output terminal 39. Rectifier X313 limits the rise of potential of the control grid of valve V301 in the positive-going direction while rectifier X314 connected between the cathode and the source of negative potential —10 v. similarly prevents the cathode of such valve from falling below —10 v.

The operation of this arrangement follows conventional lines, a positive-going input potential being necessary at each of the input terminals 36, 37 and 38 which are actively used before the potential of the control grid of valve V300 is raised. When this occurs the corresponding fall of potential at the anode of the valve causes the control grid of valve V301 to move negatively thereby producing a corresponding fall in the output potential at the valve cathode which is applied to output terminal 39. Thus the output potential at terminal 39 is normally high, i.e. above earth, and moves to the —10 v. negative level only during those periods when a coincidence positive-going voltage is applied to each of the input terminals 36, 37 and 38 to provide the required combined gating and inverting function.

As with the gates previously described any unrequired input terminals are left unconnected. If an ungated inverter is required only one of the input terminals 36, 37, 38 is actively employed and the others are left unconnected.

SEPARATE GATE DEVICE

The third unit used in the machine shown in Fig. 4A comprises three separate 4-input coincidence gates G and a separate cathode follower stage CF. Fig. 4B illustrates one of the 4-input gates G denoted by the three uppermost symbols of Fig. 4A and comprises rectifiers X400, X401, X402 and X403 connected respectively between input terminals 41, 42, 43 and 44 and resistor R301 and to the control grid of valve V400 which is arranged as a cathode follower with a cathode load resistor R401. Terminal 46 constitutes the output terminal connected to the cathode of the valve although a second terminal 45 is provided and is normally directly bridged to terminal 46 so as to join the cathode load resistor R401 into circuit. This bridge connection is provided to allow the output of several separate gates to be joined to a single cathode load resistor if desired. Rectifier X404 connected between the cathode output point and the source of potential —10 v. serves to limit the fall of cathode potential.

The operation of this arrangement is self-evident from the description already given with relation to the similar gates of Fig. 3B and Fig. 3C. A positive-going input is necessary at each of the used input terminals before a corresponding positive-going output is made available at the output terminal 46. If less than 4 inputs are required on any one gate the unused inputs are left unconnected.

CATHODE FOLLOWER DEVICE

The cathode follower circuit CF, denoted by the lowermost symbol in Fig. 4A, is shown in Fig. 4C and comprises valve V401 arranged with its cathode connected to output terminal 49 which is capable of being strapped directly to terminal 48 connected through cathode load resistor R402 to the source of negative potential —150 v. The control grid of valve V401 is connected to input terminal 47. Rectifier X405 limits the negative potential level of the cathode of valve V401 to —10 v.

The operation of this circuit follows that of ordinary cathode follower practice, any potential input applied to terminal 49 producing a corresponding output potential at terminal 48 subject to the clamping action of rectifier X405.

MIXER DEVICE

The symbol shown in Fig. 5A indicates a signal mixing or buffer circuit for combining two or more separate input conductors to a single output conductor without reaction of any input present on one conductor upon the sources of the inputs to the remaining input conductors. The practical circuit of such an arrangement is shown in Fig. 5B and consists of the inclusion of appropriately arranged rectifiers X500, X501, X502 ... in each of the input leads from input terminals 50, 51, 52 ... to the single output terminal 54.

MAGNETO-STRICTION WORD-LENGTH REGISTER DEVICE

The word-length registers employed in the present machine utilise short magneto-striction delay lines as described in detail in the aforesaid U.S.A. patent application Serial No. 303,552. Such magneto-striction delay line devices can conveniently be broken down into the components symbolically illustrated in Figs. 6A, 7A, 8A and 9A comprising respectively the magneto-striction line and its following line amplifier LA, a main amplifier A fed with the output from the line amplifier LA, a shaper circuit S fed from amplifier A and a line driver T which is connected to the input end of the line. Such elements are, effectively, connected in the form of a closed loop in the order stated to form a complete circulating word-length register although, in practice, provision is made for the controlled insertion and withdrawal of word signals to and from the line by controlled opening of the loop between the shaper S and the driver T as will be explained later.

Referring now more particularly to Fig. 6B which shows the practical circuit arrangement for the line and its interconnected line amplifier LA, the device comprises a length of wire 600 of a material, e.g. nickel, which exhibits appreciable magneto-striction. An output coil 601 surrounds one end of such wire while at the opposite end two further, input, coils 602 and 603 also surround the wire. Upon the application of an electric pulse to one or other of the input coils 602, 603 the change of magnetisation in the adjacent region of the wire 600 sets up, by magneto-strictive effects, an acoustic pulse within the wire which is propagated through the latter in both directions. The pulse travelling towards the nearest end is absorbed by suitable support of that end of the wire within, for example, a sleeve packed with petroleum jelly as shown at 604 while the other pulse travels along the length of the wire and in passing through the coil 601 causes a disturbance of either the remanent, or an externally applied, magnetism and thereby generates a voltage pulse in the coil 601 before being absorbed in the similar termination 605 at such further end of the wire. By adjustment of the spacing distance along the length of the wire 600 between the input coil and the output coil, so the time delay time can be altered. In the present machine use is conveniently made of two alternative delay times equal respectively to 30 digit periods and 34 digit periods and the positioning of the coils 602 and 603 is such that by use of coil 602, a 30 digit period delay can be obtained whereas by the use of coil 603, a 34 digit delay can be obtained. The coils 603, 604 are connected to pairs of input terminals 60, 60' and 61, 61' for connection to the output from the driver T, to be described later, according to the required delay interval.

The output coil 601 is connected between earth and the control grid of valve V600 arranged as a normal pentode amplifier and applying its anode output through coupling capacitor C600 to the control grid of a following valve V601 arranged as a cathode follower with a high resistance cathode load formed by resistors R600 and R601. The cathode output of this valve is connected to output lead 62.

Referring now to Fig. 7B which shows the practical form of the main amplifier A, the input on lead 62 from the preceding line amplifier LA is applied through capacitor C700 to the control grid of valve V700 arranged as a voltage amplifier having its anode output fed through capacitor C701 to the control grid of a second amplifier valve V701 also arranged as a voltage amplifier. The anode output of valve V701 is applied through capacitor C702 to the control grid of a further valve V702 arranged as a cathode follower having a cathode load resistor R700 connected to the source of negative potential −150 v. The control grid of valve V702 is arranged with a biasing network for its control grid such that the output voltage at the cathode of the valve V702 connected by way of lead 70 to the subsequent shaper S, about to be described, is normally at a negative resting level and rises to a potential above earth upon the application of a generated pulse in the output coil 601 of the magneto-striction line 600 of Fig. 6B.

Referring now to Fig. 8B which shows the arrangements of the shaper circuit S, the output on lead 70 from valve V702 in Fig. 7B is connected to terminal 80 which is in turn connected to the control grid of valve V800 by way of rectifier X800. A second rectifier X801 is connected between such control grid and the bus-bar carrying the "Strobe" pulses, Fig. 14, diagram (G), which are positive-going at the correct time instant of commencement of a digit pulse during each digit period.

Valve V800 is arranged as a cathode follower with a cathode load resistor R800 connected to source of negative potential −150 v. and having its cathode connected by way of rectifier X802 directly to the control grid of a further valve V801 which is also arranged as a cathode follower with a cathode load resistor R801 likewise connected to source of negative potential −150 v. The control grid of valve V801 is connected through series rectifiers X803, X804 to the bus-bar carrying the "Reset" pulses, Fig. 14, diagram (D), which, as already stated, are negative-going at the end of each normal positive "Clock" pulse time period. Such control grid is also connected to one terminal of a holding capacitor C800 whose other terminal is connected to the potential source −20 v. The cathode of valve V801 is connected to the output terminal 81 and also by way of a rectifier X805 to the source of negative potential −10 v. for the purpose of limiting the potential fall at the cathode of valve V801 to −10 v.

In the operation of this pulse shaper circuit, the rectifiers X800 and X801 constitute a coincidence gate whereby the control grid of valve V800 is driven positive only when a "Strobe" pulse coincides with a positive output from the preceding main amplifier A, Fig. 7B. When this occurs the cathode of valve V800 likewise moves positively to charge capacitor C800 and to cause the control grid of valve V801 also to move positively. By the arrangement of the rectifiers as shown, the capacitor C800 remains charged positively even after the positive-going output from valve V800 decays due to the termination of the "Strobe" pulse so that the control grid of valve V801 continues to be held at its raised level until the arrival of the subsequent negative-going "Reset" pulse which, through rectifiers X803 and X804, discharges the capacitor C800 and returns the potential of the control grid of valve V801 to its normal lower level. A corresponding square-sided positive-going pulse is developed at the cathode of valve V801 and is available at output terminal 81.

Referring now to Fig. 9B which shows the circuit arrangements of the driver T, this comprises a valve V902 arranged as a power amplifier with a pulse transformer T900 connected in its anode circuit and with its cathode connected to earth through biasing resistor R900. The control grid of the valve is connected to input terminal 90 and also by way of rectifier X900 to the bus-bar carrying the "Clock" pulses, Fig. 14, diagram (C).

Upon the application of a positive-going signal pulse to input terminal 90, the control grid of valve V902 will be driven positively during the period of a coincident "Clock" pulse, to supply a corresponding current pulse to the primary winding of the transformer T900 and thereby to generate in the secondary winding of such transformer an output pulse of appropriate polarity for application to the selected coil 602, 603 of the magnetostriction line of Fig. 6B through output terminals 91, 92 which are connected either to terminals 60, 60' or 61, 61' of the line according to whether a 30 or a 34 digit period delay is required.

C.W. UNIT

Fig. 10A shows the symbol for the so-called C.W. unit which is effectively a filter circuit for insertion in each of a number of control wires between the main body of the machine and a movable control desk.

The form of such coupling circuit is illustrated in Fig. 10B and comprises a series resistor R100 in the control lead 100, such control lead being connected to the source of negative potential −150 v. by way of a resistor R101 and also through a rectifier X101 to the source of negative potential −10 v. The control wire is additionally shunted to earth through capacitor C100. In operation the series resistor and shunting condenser serve to produce a steadily rising potential on lead 100 when the remote, control desk end of such lead is connected to a positive potential source, such lead potential rising from the −10 v. clamp level set by rectifier X101 to above the threshold value for opening a gate or the like.

Having thus defined the nature and the detailed circuit form of the various symbols used in Figs. 11A–11G, 12A–12F and 13, each of the various units will now be described in detail.

STORE

Referring now to the block schematic diagram of Fig. 1A the store S of the machine comprises a magnetic recording disc or drum MD arranged to be continuously rotated by an electric motor EM supplied with energising current from a suitable source (not shown). The motor speed is capable of regulation by variation of a D.C. current applied to its field windings over lead 120. The drum or disc MD has at least 10 separate endless recording tracks, 8 of which, RT0, RT1, RT2 . . . RT7, serve to store data (number and instruction) words and others of which, indicated schematically in Fig. 1A as CT and AT, serve to provide respectively a series of clock pulses and address signals.

Each track is arranged to be capable of storing 128, 32-digit, words with their two-digit separation spaces whereby the drum speed is just under 4600 r.p.m. The clock pulse track has a permanent recording of a form which provides a substantially sinusoidal output comprising one cycle for each digit storage space or cell around the remaining tracks. A reproducing head CTH associated with this clock pulse track CT accordingly has induced therein an alternating current of a frequency approximately 333.3 kilocycles/sec and this is applied to a frequency discriminator circuit FDC which provides a D.C. output whose magnitude is dependent upon the relationship between the frequency of the derived clock pulses (and hence the actual speed of rotation of the magnetic recording disc or drum MD) and the correct design frequency corresponding to the required digit period time (3 microseconds) within the machine. This D.C. output is magnified in a direct-current amplifier DCA and is then applied over lead 120 to the field windings of the motor EM to regulate the speed of the latter so as to maintain it at the required value.

A separate recording/reproducing or write/read head DTH0, DTH1 . . . DTH7 is associated with each of the 8 word recording tracks RT0, RT1 . . . RT7 on the disc or drum MD and by means of decoder circuits DCD, to be described later with reference to Fig. 13, any required one of such heads can be connected either to the output lead 101 from, or the input lead 102 to, the store S under the control of voltages developed from the address signalling digits A1 or A2 of an instruction word within the control system CL.

The address track AT has recorded at each of 128 equi-spaced positions therearound, a 7-digit binary pulse signal train which is representative of a different one of the 128 word storage locations in turn. Thus the first of the 128 address recordings will be the 7 digits 0000000 indicative of address location 0, the next 0000001, the third 0000010 and so on. A reproducing or read head ATH associated with the address track AT provides a continuous train of signals reproduced from such address recordings and these are arranged to occur immediately before the related word storage position in any of the other 8 word storage tracks becomes available at the associated read/write head DTH0, DTH1 . . . DTH7 for such track. Thus during the period when a word located in storage position 127 (1111111) in any one of the word storage tracks RT0, RT1 . . . RT7 is available at its associated read/write head, the address signal being delivered from the address track read head ATH is that of the next storage location about to become available, namely address location 0 (0000000). The form of the magnetic drum or disc can be according to any of the now well known types, for instance, as described in U.S. Patents Nos. 2,540,654 or 2,609,143 or as described in Electronic Engineering, July 1949, pp. 234–238. The heads DTH, CTH and ATH for the word storage, the clock and the address tracks may likewise be of any well known type as described in the literature quoted above while the frequency discriminator FDC may likewise be of any suitable type, for instance, that known as the Foster Seeley circuit described for example in Terman's "Radio Engineers Handbook" 1943, p. 586.

CONTROL SYSTEM
Pulse generators

The arrangements of the pulse generator unit PGA, Fig. 1A, used for generating the principal control waveforms are shown in Fig. 11A and comprise two sections. In the first section, the sine-wave output from the clock track head CTH of the store S is fed over lead 103 to a normal amplifier 201 whose output is applied to a pulse squaring circuit 202, e.g. of the biased rectifier type, which converts the sine waveform into the square pulse formation shown in Fig. 14, diagram (C). This constitutes the "Clock" waveform which is then fed to output amplifier 203 for supply whenever required throughout the machine.

The same "Clock" waveform is applied to a short pulse generating circuit 204, for example a differentiating circuit followed by an over-biased amplifier, whereby each negative-going edge of the "Clock" waveform provides a coincident sharp negative spike as shown by the "Reset" pulse waveform of Fig. 14, diagram (D). This waveform is then fed through output amplifier 205 to the necessary points throughout the machine.

The "Reset" waveform is also fed to a further short pulse generating circuit 206 whereby the positive-going trailing edge of each "Reset" pulse generates a short positive-going pulse to form the "Strobe" waveform of Fig. 14, diagram (G). After amplification in output amplifier 207 this waveform is then made available where required throughout the machine.

The second section of the pulse generating arrangements is concerned with the generation of timed pulses occurring once during each beat period in a particular digit period thereof. These are denoted throughout Figs. 11A . . . 13 of the drawings by a number within a circle, the number indicating the digit period within which the pulse occurs. Thus 31 within a circle indicates a positive-going pulse during the digit interval 31 of each beat, as shown in Fig. 14, diagram (H), 1 within a circle a positive-going pulse during digit interval 1 and so on. The indications $\overline{31}$, $\overline{32}$ and so on within circles denote an inverse version wherein the waveform is normally at a positive resting level and has a negative-going pulse during the indicated digit interval. The $\overline{31}$ pulse waveform as shown in Fig. 14, diagram (1).

Referring again to Fig. 11A signals from the address track head ATH of the store S are fed over lead 104 to a read amplifier 208 of conventional form and thence to a pulse squarer 209 whose output is applied to a shaper 210 similar to that shown in Fig. 8B. This last unit provides, on lead 105, the so-called "address" signals referred to later. Such address signals are also applied to gate 211 which is capable of being opened by closure of a control switch 212 through C.W. unit 213 so that the address signal on lead 105 passes to the line driver 214 of a 34-digit period delay constituted by line and line amplifier 215 and amplifier 216 and arrives after a 34-digit period delay at the control terminal of a conventional free-running multivibrator 217. This multivibrator is arranged to have an on-time period of about ¾ of one word time period, say 25 digit periods, and a natural offtime of more than one word time period, say about three word time periods. The multivibrator is so arranged, e.g. by combination with a shaper circuit as in Fig. 8B, that when it goes on it gives out a single digit pulse. The address signals provided from the shaper 210 may comprise any permutation of pulses in digit periods 2 to 8 of the word pulse train for defining an address location as already explained. In addition, however, such address signals always comprise a further trigger pulse in each digit position 31. This pulse in digit position 31 will, at least after the first operation, be the pulse which puts the multivibrator 217 on and the single digit pulse output from the latter occurs in each 31 digit period of the machine beat rhythm. Because the multivibrator has just gone on at digit period 31 time, it cannot be set again by any of the next following address pulses, but at the end of one word time, that is when the next trigger pulse at digit 31 time appears, the multivibrator has already gone off again and is ready to generate another pulse and does so when the trigger pulse arrives. The normal running circulation for the line 215 is via gate 218 which is normally held open by potential supplied through normally closed control switch 219 and C.W. unit 220. Switch 212 is ordinarily closed only to effect starting but if held closed the circuit will produce a series of 31-pulses without the aid of the address signal output from the store S.

The single pulse output from multivibrator 217 at each 31 digit time is applied to cathode follower 221 to constitute the 31-pulse waveform shown in Fig. 14, diagram (H). The same pulse output from multivibrator 217 is also applied through amplifier 222 and inverter 223 to cathode follower 224 whose output constitutes the $\overline{31}$-pulse waveform shown in Fig. 14, diagram (I).

The same pulse output from multivibrator 217 is applied to a series chain of unit delays 225, 226 . . . 236. The one period delayed output from unit delay 225, occurring in digit period 32 of the beat, is made directly available as the 32-pulse waveform and is also applied to amplifier 237 and inverter 238 to provide from the latter, the inverse or $\overline{32}$-pulse waveform. Similarly the further delay output from unit delay 226 is made available as the 33-pulse waveform and, after application to an amplifier and inverter, as the $\overline{33}$-pulse waveform. Again in similar manner, the further delayed output from unit delay 227 is made available as the 34-pulse waveform and after amplification and inversion as the $\overline{34}$-pulse waveform. In similar manner the further delayed output from unit delay 228 is made available as the 1-pulse waveform, the delayed output from unit delay 229 as the 2-pulse waveform and so on, the output from the final unit delay 236 constituting the 9-pulse waveform. These waveforms are used at various places within the machine for timing purposes as will become apparent later from the detailed description which will be given and are accordingly supplied to individual bus-bars shown collectively in Figs. 1A, 1B and 1C as cable GL1.

*Delay chain*

Figure 11C:
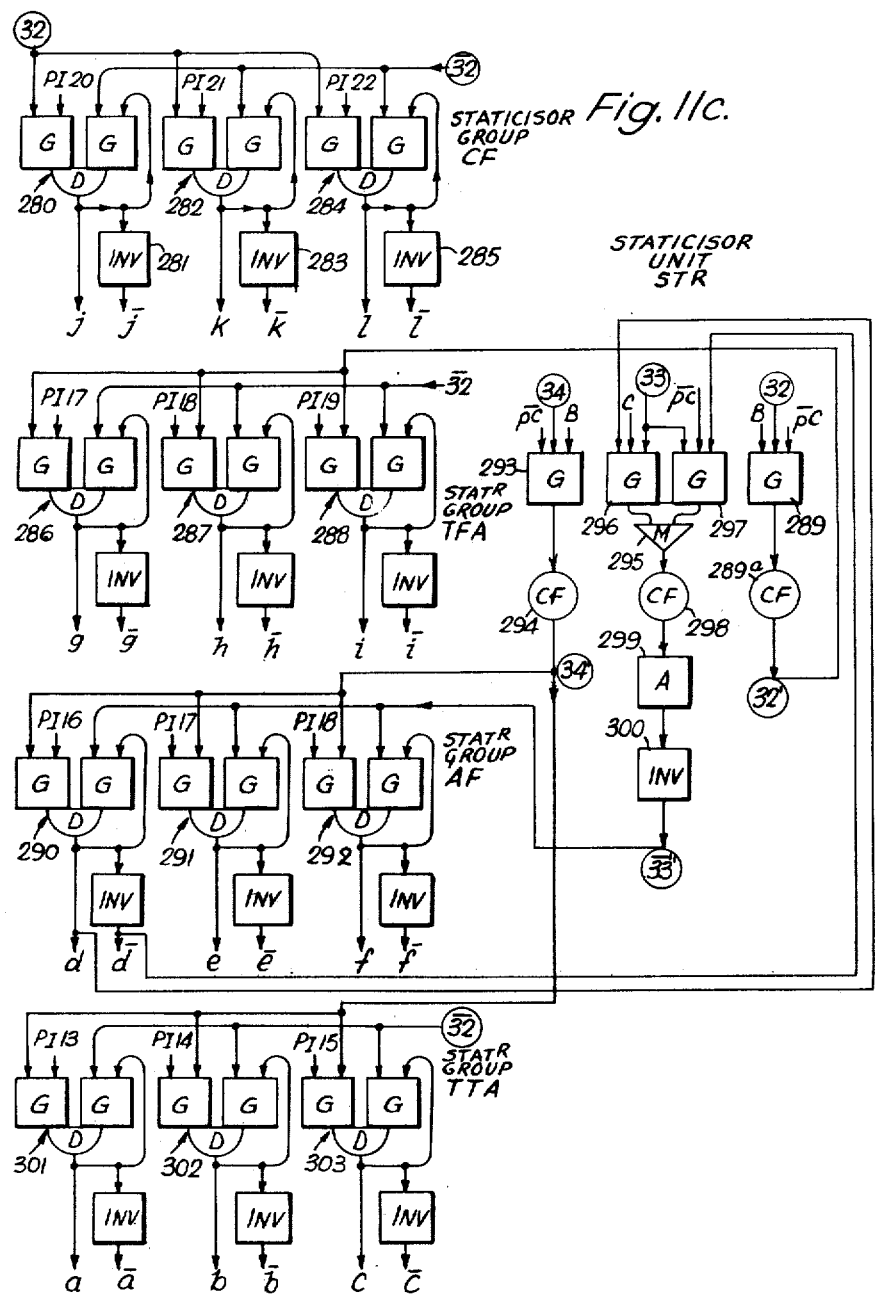

Referring now to Fig. 11B which shows the arrangements of the delay chain DC, Fig. 1A, this unit comprises a gate 240 having one input supplied by way of lead 101 with output signals from the store S and having three further controlling inputs comprising respectively the C waveform from heat circuit BC, the TC.B waveform from the conditional order selector COS and a potential derived from a start switch 241. For the moment it will be assumed that all of these control potentials are such that the gate 240 is open to allow the store output pulse train on lead 101 to pass therethrough. The output from gate 240 is applied via mixer 242 to a chain of 22 unit delays 243, 244 . . . 264. An output is taken from the output side of mixer 242 to constitute the so-called PI1 output. The output from unit delay 243 is similarly made available as the PI2 output while the outputs from the later unit delays 254 . . . 264 are each made available externally as the PI13 . . . PI23 outputs. These outputs which are at respectively different timings are used, as will be described later with reference to Figs. 11C, 11D, 11F and 11G, to control the operation of the staticisor unit STR, the beat circuit BC, the track selection staticisors TSM and the read/write decode circuits RWD and are accordingly fed by separate bus-bars shown collectively in Figs. 1A and 1B as cable GL3.

The delay chain arrangements include further gates 265, 266 whose outputs are also applied to the mixer 242. The controlling inputs for gate 265 comprise respectively the output from gate 267 fed through an inverter 268, the output from a mixer 269 fed through cathode follower 270, the potential controlled by start switch 241 already referred to and the output from the shaper 271 of a 34-digit period delay loop made up of amplifier 272, line and line amplifier 273, driver 274 and the 4 unit delays 243 . . . 246. The line element 273 itself is of only 30-digit period delay time. The circulation loop thereof is completed via the mixer 242 and gate 265 and this constitutes the instruction register ISR, Fig. 1A.

The gate 266 is controlled by the function control waveforms $\bar{\jmath}$, $k$, $l$ derived from the staticisors STR yet to be described and governs the supply to mixer 242 of the output on lead 107 from the X-register of the arithmetic unit AU.

The control potential for gates 240 and 265 from start switch 241 is derived by way of C.W. unit 275, gate 276 conditioned by the SS waveform from the single shot circuit OS and cathode follower 277 followed by an inverter 278.

The detailed operation of the various control gates 240, 265 and 266 to the delay chain will be referred to in detail later after description of further elements of the machine from which the various controlling potentials are derived. It is sufficient for the moment to appreciate that an instruction word pulse train fed into the delay chain of unit delays 243 . . . . . 264 passes therethrough and becomes available at the different output points thereon at progressively later time instants, relative to its original input timing, in accordance with the number of unit delays that exist between the input point and the particular output employed. Furthermore, under certain operating conditions such inserted instruction word pulse train is inserted into the word register including the line 273 and is thereafter re-presented to the delay chain once in each beat interval until erased from such register by the closing of gate 265.

*Staticisors*

The staticisor unit STR containing the staticisor used for staticising each of the four groups of 3 function digits CF, TFA, AF and TTA is shown in Fig. 11C. Each of the staticisor sections which deal with an individual digit of the instruction word comprises a trigger circuit arrangement utilising a combined two-gate and unit delay device as described in detail with reference to Figs. 3A, 3B and 3C. Broadly such trigger circuit is constructed by feeding back the output from the unit delay to one controlling input of one of the gates, the other controlling input of which is supplied normally with a gate opening potential and with a gate closing potential immediately preceding the digit period when the sustained output from the trigger is required to cease. The opposite gate is supplied at one of its two controlling inputs with the pulse waveform from which it is desired to staticise a selected digit signal and at its other input with a gate opening pulse timed to coincide with the digit period of the digit pulse signal which is to be staticised.

In the operation of such a circuit the second mentioned gate, being opened at the correctly timed instant, either allows a pulse to pass therethrough from the input signal train if the value of the selected digit signal is "1" or provides no input at all if the digit value is "0." If the digit value is "1" then a pulse is passed through the gate and through the subsequent unit delay and upon emerging from the latter is then returned to re-enter the first mentioned gate thereby again passing through the delay in the following digit period and thereafter continuously circulating around the closed loop until the first mentioned gate is momentarily closed by the applied negative-going gate closing pulse whereafter the circulation ceases. The output from the unit delay is available as the equivalent of the normal static control potential from a conventional trigger-circuit type of staticisor and is in the form of a repeated series of digit pulses, one in each digit period of the time interval between the instant of initiation and the subsequent instant of termination of the trigger operation. Such output is available in its normal direct form, i.e. as positive-going pulses from a negative resting level and also, by application to an inverter, in the inverse form comprising negative-going pulses from a positive resting level.

Referring now to Fig. 11C in detail the staticisor group CF comprises a first trigger arrangement consisting of combined double-gate/unit-delay element 280. The output from the unit delay is fed back to one input to the righthand gate element, the other input of which is supplied with the $\overline{32}$-pulse waveform from cable GL1. The left-hand gate is supplied with the 32-pulse waveform from the same cable GL1 at one input and with the PI20 output signal from the delay chain DC of Fig. 11B at its other input. The output from the unit delay is available as the $j$ function control waveform and is also applied to an inverter 281 whose output is available as the $\bar{j}$ function control waveform.

It will be found that the instruction word pulse train available through output PI20 of the delay chain is of such timing that the 13th digit thereof coincides with the 32-pulse time of the machine rhythm and consequently if the aforesaid 13th instruction word digit is of value "1," a pulse will be fed into the circulating loop to be passed therearound once in each subsequent digit interval until the right-hand gate is closed by the negative-going pulse at 32 digit time of the $\overline{32}$-pulse waveform. During the intervening period a series of normal positive-going digit pulses is available as the $j$ function control waveform and a corresponding series of inverse negative-going pulses as the $\bar{j}$ output function control waveform.

A similar arrangement comprising double-gate/unit-delay element 282 with inverter 283 is supplied with the PI21 output from the delay chain DC, Fig. 11B, to provide a similar pair of staticised outputs dependent upon the signalled value of the 12th instruction word digit and known respectively as the $k$ and $\bar{k}$ function control waveforms. A third circuit arrangement comprising double-gate/unit-delay element 284 and inverter 285 is fed with the PI22 waveform and provides the $l$ and $\bar{l}$ function control waveforms.

These three CF digits specify the functions of the control unit according to the following code.

| Digit | | | Trigger outputs which are all at active (+ve) level | | | Control function |
| --- | --- | --- | --- | --- | --- | --- |
| 13 | 12 | 11 | | | | |
| 0 | 0 | 0 | $\bar{j}$ | $\bar{k}$ | $\bar{l}$ | Normal action. |
| 0 | 0 | 1 | $\bar{j}$ | $\bar{k}$ | $l$ | Transfer control conditional on the contents of the accumulator being negative. |
| 0 | 1 | 0 | $\bar{j}$ | $k$ | $\bar{l}$ | Transfer control conditional on the contents of the accumulator being zero. |
| 0 | 1 | 1 | $\bar{j}$ | $k$ | $l$ | Obey the order in the X register. |
| 1 | 0 | 0 | $j$ | $\bar{k}$ | $\bar{l}$ | Normal action. |
| 1 | 0 | 1 | $j$ | $\bar{k}$ | $l$ | Work double length. |
| 1 | 1 | 0 | $j$ | $k$ | $\bar{l}$ | Normal action. |
| 1 | 1 | 1 | $j$ | $k$ | $l$ | Test the operations-completed line. |

A further similar group of three trigger circuit arrangements 286, 287 and 288 serve to staticise the TFA (14–16) digits of an instruction word. Such devices are supplied respectively with the PI17, PI18 and PI19 signal outputs from the delay chain DC of Fig. 11B and with the $\overline{32}$-pulse waveform as the inhibiting medium and with a specially manufactured pulse known as the 32'-pulse as their initiating medium. They provide the $g$ and $\bar{g}$, $h$ and $\bar{h}$ and $j$ and $\bar{j}$ function control waveforms respectively.

The aforesaid manufactured 32'-pulse is derived from the normal 32-pulse waveform through the gate 289 supplied with the 32-pulse waveform and the B and $\overline{pC}$ control waveforms from beat circuit BC. The gate 289 supplies a cathode follower 289a and the output from the latter constitutes the 32'-pulse waveform. The derivation of the B and $\overline{pC}$ waveforms will be described later but broadly the function is that the 32'-pulse is supplied only under certain operational conditions determined by the aforesaid B and C waveforms.

These TFA digits (14–16) and their accompanying staticised waveforms specify a transfer from the accumulator of the machine according to the following code.

| Digit | | | Trigger outputs which are all at active (+ve) level | | | Transfer from accumulator |
| --- | --- | --- | --- | --- | --- | --- |
| 16 | 15 | 14 | | | | |
| 0 | 0 | 0 | $\bar{g}$ | $\bar{h}$ | $\bar{i}$ | Nowhere. |
| 0 | 0 | 1 | $\bar{g}$ | $\bar{h}$ | $i$ | Round off. |
| 0 | 1 | 0 | $\bar{g}$ | $h$ | $\bar{i}$ | Output. |
| 0 | 1 | 1 | $\bar{g}$ | $h$ | $i$ | Multiplier register. |
| 1 | 0 | 0 | $g$ | $\bar{h}$ | $\bar{i}$ | Multiplicand register. |
| 1 | 0 | 1 | $g$ | $\bar{h}$ | $i$ | X register. |
| 1 | 1 | 0 | $g$ | $h$ | $\bar{i}$ | Track switching. |
| 1 | 1 | 1 | $g$ | $h$ | $i$ | Store. |

The AF staticisor group comprises three precisely similar trigger circuit arrangements 290, 291 and 292 supplied respectively with the PI16, PI17 and PI18 signal outputs from the delay chain DC, Fig. 11B, and arranged to be initiated by a special 34'-pulse waveform referred to below and reset or inhibited by a further special $\overline{33}''$-pulse waveform also referred to below.

The respective outputs from these three trigger circuit arrangements form the $d$ and $\bar{d}$, $e$ and $\bar{e}$ and $f$ and $\bar{f}$ function control waveforms respectively.

The derivation of the aforesaid 34' waveform used for initiating each of the AF triggers is through the gate circuit 293 controlled also by the aforesaid B and $\overline{pC}$ waveforms, the gate output being applied to a cathode follower 294 to provide the 34'-pulse waveform. As with the case of the 32'-pulse waveform, the general function is to provide a 34'-pulse only under certain operating conditions. The $\overline{33}''$-pulse waveform is derived from the arrangements comprising gates 296 and 297 each supplied with the 33-pulse waveform, the gate 296 being controlled also by the $d$ function control waveform from trigger 290 and the C waveform from beat circuit BC whereas the gate 297 is controlled by the aforesaid $\overline{pC}$ waveform and the $\bar{d}$ waveform from trigger 290. The two gate outputs are combined in a mixer 295 and fed to a cathode follower 298 and thence via an amplifier 299 and an inverter 300 to form the aforesaid $\overline{33}''$-pulse waveform. As with the previously discussed 32'- and 34'-pulse waveforms the general function is that the $\overline{33}''$-pulse waveform is made available in digit time 33 under certain operating conditions only. The nature of these will become apparent after a more detailed description of the machine and its operation has been given.

The aforesaid AF digits (17–19) of the instruction and their accompanying staticised waveforms define the accumulator function according to the following code.

| Digit | | | Trigger outputs which are all at active (+ve) level | | | Accumulator function |
| --- | --- | --- | --- | --- | --- | --- |
| 19 | 18 | 17 | | | | |
| 0 | 0 | 0 | $\bar{d}$ | $\bar{e}$ | $\bar{f}$ | Add. |
| 0 | 0 | 1 | $\bar{d}$ | $\bar{e}$ | $f$ | Multiply. |
| 0 | 1 | 0 | $\bar{d}$ | $e$ | $\bar{f}$ | Multiply by $2^n$. |
| 0 | 1 | 1 | $\bar{d}$ | $e$ | $f$ | Multiply by $2^{-n}$. |
| 1 | 0 | 0 | $d$ | $\bar{e}$ | $\bar{f}$ | Replace. |
| 1 | 0 | 1 | $d$ | $\bar{e}$ | $f$ | Not equivalent. |
| 1 | 1 | 0 | $d$ | $e$ | $\bar{f}$ | Subtract. |
| 1 | 1 | 1 | $d$ | $e$ | $f$ | Collate. |

The TTA group of staticisors follows similar lines comprising three trigger circuit arrangements 301, 302 and 303 as already described, supplied respectively with the PI13, PI14 and PI15 signal outputs from the delay chain DC of Fig. 11B. Each trigger circuit arrangement is initiated in its operation by the 34'-pulse waveform already described and is inhibited by the $\overline{32}$-pulse waveform. The respective trigger circuits provide the $a$ and $\bar{a}$, $b$ and $\bar{b}$ and $c$ and $\bar{c}$ function control waveforms respectively.

These TTA digits (20–22) of the instruction and their accompanying staticised waveforms serve to define transfers to the accumulator of the machine according to the following code.

| Digit | | | Trigger outputs which are all at active (+ve) level | | | Transfer to accumulator from— |
|---|---|---|---|---|---|---|
| 22 | 21 | 20 | | | | |
| 0 | 0 | 0 | $\bar{a}$ | $\bar{b}$ | $\bar{c}$ | Nowhere. |
| 0 | 0 | 1 | $\bar{a}$ | $\bar{b}$ | $c$ | All ones. |
| 0 | 1 | 0 | $\bar{a}$ | $b$ | $\bar{c}$ | Input (and step-on input reader). |
| 0 | 1 | 1 | $\bar{a}$ | $b$ | $c$ | Multiplier register. |
| 1 | 0 | 0 | $a$ | $\bar{b}$ | $\bar{c}$ | Multiplicand register. |
| 1 | 0 | 1 | $a$ | $\bar{b}$ | $c$ | X register. |
| 1 | 1 | 0 | $a$ | $b$ | $\bar{c}$ | Word generator. |
| 1 | 1 | 1 | $a$ | $b$ | $c$ | Store. |

*Beat circuit*

The beat circuit BC of the machine primarily controls the selection of either the first address digits A1 or the second address digits A2 of an instruction word for comparison with the address signal arriving from the address track of the store S in order to determine coincidence.

The beat circuit is shown in detail in Fig. 11D and fundamentally comprises a trigger circuit arrangement of the kind already referred to in connection with the staticisors, Fig. 11C, and consisting of a two-gate/unit-delay arrangement 305 comprising input gates 306 and 307. The output from the delay unit 308 provides the beat or B-waveform used in units STR, OS, TSM and RWD of the control system and in unit COS of the arithmetic unit AU and an inverse version thereof, the $\bar{B}$-waveform which is derived through inverter 309 and used in unit TSM of the control system. Gate 306 has one input connected to complete the closed loop necessary to form the trigger arrangement and its other input, together with one input of the opposite gate 307, is supplied with the output from an inverter 310 supplied by gate 311 to be discussed later. Another input of the gate 307 is derived from an inverter 312 whose input is connected to a junction point 313 having several possible input sources as described later. The third input to the gate 307 is derived from a cathode follower 314 which also supplies a further input of the gate 311, such cathode follower being supplied from a gate 3150 whose controlling inputs comprise the 34-pulse waveform and a $\overline{TC34}$ waveform which is normally at an active (positive) level and which is derived from the conditional order selector COS described later.

The arrangemnets of the beat circuit include coincidence testing means which look for coincidence between the chosen one of the instruction word address signals and those arriving over lead 105 from the pulse generator unit PGA and which are derived initially from the address track AT on the device MD of the store S. Such arrangements comprise gates 315, 316 supplied respectively with the PI2 and PI14 signal outputs from the delay chain DC of Fig. 11B and controlled respectively by the B and $\bar{B}$ control waveforms from the beat circuit BC. The outputs from these gates are fed to unit delay 318 one of whose outputs is fed to a two input coincidence gate 319. The second input of the gate 319 is derived through unit delay 320 from the aforesaid address track AT of device MD on lead 105. A second output of each of the delays 318 and 320 are combined and fed to form one controlling input for a gate 322, another input of which is derived from gate 319 through inverter 323. This gate 322 has a further controlling input derived from a trigger circuit arrangement consisting of a double-gate/unit-delay structure including gates 324, 325. Gate 324 is supplied only with the 2-pulse waveform whereas gate 325, in addition to having one input supplied with the output of the associated unit-delay, has its other input controlled by the $\bar{9}$-pulse waveform derived from the 9-pulse waveform through inverter 326. This trigger circuit arrangement is accordingly set on to provide an active pulse output at digit 2 time in each beat and is set off again at digit 9 time. The gate 322 which is, in part, controlled thereby can accordingly only be opened during the period of digit times 3–9 inclusive of each beat.

Gate 322 forms one input gate of a further 2-gate/unit delay trigger arrangement 327, the other gate 328 of which, in addition to control by the feedback loop from the delay 329, is also controlled by the $\overline{34}$-pulse waveform whereby the trigger, if set on, is always reset off at 34-digit time of each word period. The output from the delay 329 of such trigger 327 is applied as one input to the aforesaid junction point 313 of the beat circuit.

It will be apparent, after consideration of the delay chain arrangements, Fig. 11B, and remembering that the instruction word pulse train recirculates around the 34-digit delay of line 273 as well as travelling along the delay chain itself, that the first address code digits A1 in the instruction word will appear at output PI2 during digit periods 2 to 8 inclusive, and that the second address code digits A2 will appear at output PI14 during the same periods. Assuming, firstly, that the beat circuit is in the state in which the B-waveform is at its active (+ve) level, then the delay chain output at PI2 will pass from gate 315 via delay 318 to gate 319, to which is also applied, via lead 105 and delay 320, the signals coming through the pulse generator unit PGA from the address track AT of the store S. As already explained gate 322 is conditioned to be opened each word time during digit periods 3 to 9 inclusive by trigger arrangement including gates 324, 325. Consequently, if a non-coincidence occurs between the mixed output from delays 320 and 318, and the output from inverter 323 during these digit periods, trigger 327 will be set on and the delay 329 will give an output. The gate 322 is, in fact, looking for non-coincidence between the address code signal A1 and the address track signal coming from the store S. Thus, if the corresponding digits of each signal are of value "0" (no pulse) neither of delays 318, 320 will give an output, gate 322 cannot open owing to the mixed output of the two delays on lead 121 being inactive whereas if the corresponding digits of each signal are of value "1" (both pulses) both delays 318, 320 provide an output but gate 322 is still kept closed owing to the resultant supply of a signal from gate 319 to the inverter 323 and the consequential output from the latter being inactive. If, on the other hand, the PI2 digit is of value "1" and the corresponding address digit is of value "0" delay 318 gives an output and delay 320 does not, the gate 319 is not opened and inverter 323 therefore provides an output coincident with the output arriving on the mixed delay lead 121 thereby setting the trigger 327 on. Similarly, if delay 320 provides an output and delay 318 does not, gate 319 is again not opened and inverter 323 again provides an output to set the trigger on.

Thus, only when non-coincidence is not found, that is to say, when the address signal from the store S does coincide with the coded address A1 in the instruction word, will the trigger 327 not be in its "on" state at digit 34 time at the end of the word period in which coincidence was obtained. Under these, coincidence, conditions inverter 312, which provides the $\overline{pC}$ control waveform, will supply an active level output to gate 330 of a further trigger arrangement 321 in synchronism with the 34-pulse waveform input at the other input to such gate. The trigger 321 is thus set on to provide an output, constituting the aforesaid C waveform, which is then at active ($+ve$) level until the next following 34 digit time. In this explanation it has so far been assumed that there is no signal on the other line 106 feeding the junction point 313. If a signal does come up on this line 106 the operation of the machine is stopped because inverter 312 will then have an active input and will not provide an active output. In consequence the coincidence trigger 321 cannot be set. While there is an active signal level ($+ve$) at junction point 313, due either to trigger 327 being on owing to non-coincidence or to the presence of a signal on lead 106 the current instruction word is retained in the instruction register ISR of the delay chain, Fig. 11B, by the action of the C waveform (then at inactive level) in preventing the closing of gate 265 and preventing the opening of gate 240. The purpose of the line 106 will be explained more fully when the single-shot circuits OS of the machine are described.

It has been assumed so far that the B-waveform trigger 305 was in the state in which the B-waveform therefrom was active ($+ve$). In this state pulses are circulating in the trigger via the gate 306. However, when a $\overline{pC}$-waveform from the inverter 312 goes to its active level, i.e. when there is no active signal at junction point 313, the B-trigger 305 changes its state at the next digit-34 time because the 34-pulse applied to the gate 307 via gate 3150 ($\overline{TC34}$ is normally at active level) is also applied to gate 311 which is now opened by the aforesaid $\overline{pC}$-waveform and this causes a zero output to be provided from inverter 310 thereby causing both gates 306 and 307 to be closed. The B trigger 305 is then placed in the other state, i.e. where the B-waveform is at active ($+ve$) level and gate 316 is opened instead of gate 315. The circuit now looks for coincidence between the address track signals from the store S on lead 105 second address code A2 in the instruction word contained in the PI14 output signal from delay chain DC. It will be seen that when the B-trigger is in the state in which the B-waveform is at active level, then the next active level pulse of the $\overline{pC}$-waveform will again change the state of the trigger at the next digit-34 time after the pulse appears.

It has been assumed that the $\overline{TC34}$-waveform provided by the conditional order selector COS is at an active ($+ve$) level and this is so during the normal operation of the machine.

If, however, the conditional order selector COS of the arithmetic unit (to be described later) has been operated, the $\overline{TC34}$-waveform may be at its inactive ($-ve$) level. In this case the changeover effect of the $\overline{pC}$ waveform is inhibited because the digit-34 pulse cannot pass through gate 3150. Consequently at the time of coincidence, the trigger 360 of the conditional order selector COS, Fig. 12D, having been set, the TC.B waveform from such unit COS will be at its active level and the gates 265 and 240, Fig. 11B, are respectively closed and opened and a new instruction word flows from lead 101 through gate 240 into the delay chain from the address in the store S which is specified by the first address A1 of the current order.

It will be appreciated that it may take many word periods to obtain the (normally) two coincidences between the address track signals from the store S on lead 105 and the coded address digits in the instruction word in signals PI2 and PI14 and the instruction word has accordingly to be kept in the control system during this time. This is done by means of the instruction register ISR constituted by the loop including the line 273 and its associated amplifiers and the like, Fig. 11B, which respectively feeds the current order back into the chain of delays 243 to 264 via the gate 265 until (normally) two coincidences have been obtained. When the second coincidence is obtained the C-waveform from trigger 321, Fig. 11D, is at active level and the mixed output waveform TC.B from the conditional order selector, COS, Fig. 12D, is also active, in consequence gate 267, Fig. 11B, gives an output which is inverted by inverter 268 and gate 265 is closed. At the same time, gate 240 is opened by the now-active C and TC.B waveforms and a new instruction word flows in from the store S. Alternatively, if gate 266 is opened by the CF staticisor control waveforms $\bar{j}$, $k$ and $l$, the new instruction will flow in through lead 107 and gate 266 from the X-register of the arithmetic unit AU. When the machine is first started, the control of gates 265 and 240 is somewhat modified in a way which will be described when the one-shot circuit has been explained.

Odd-even word counter

The beat circuit arrangements also comprises an alternate word counter which is also shown in Fig. 11D. This counter gives a $z$-output waveform having an active period starting at digit-3 time of each even numbered word time period and a $\bar{z}$-output waveform having an active period starting at digit-3 time of each odd numbered word time. This counter comprises a staticisor type trigger arrangement 340 fed at one gate 341 thereof with the signals on lead 105 from the address track of the store S and with the 2-pulse waveform, i.e. at digit-2 time. The signals coming from the address track AT range from 0 to 127, the number 0 arriving, as already explained, during the time when word position 127 is accessible in any of the tracks RT0, RT1 . . . RT7 of the device MD of the store.

The location-defining digits of the address signals come from the store during digit periods 2 to 8 inclusive of each beat. Consequently gate 341 of trigger 340 gives an output and the trigger goes on when the figure of least significance in the address signal (i.e. in digit period 2) is a one, that is to say, when the address signal is odd and this occurs, as explained above, during even word times. The trigger 340 is put off again at the next following digit 2-time by the application, to the other gate 343, of the $\bar{2}$-pulse derived from inverter 342 which is supplied with the 2-pulse waveform; the trigger thus yields the $z$-output waveform specified and the associated inverter 344, the $\bar{z}$-output waveform.

Single-shot circuits

The single-shot or single-stroke operation arrangements are shown in Fig. 11E.

The single-shot circuit is operated by reversal of manual key switch 346 from the normal position shown. When this key is operated a potential of $+8$ v. is removed from the circuit including C.W. unit 347 and is applied instead to the circuit including C.W. unit 348.

When gate 349 is supplied with positive potential from C.W. unit 348 the trigger arrangement 350, of which it forms a part, is set "on" at the next digit-1 time because the further trigger arrangement 352, which is normally set on, is still on at this time. Such further trigger 352, comprising gates 353, 354 has its initiating input from inverter 355 which is, in turn, supplied by way of gate 356 conditioned by the 33-pulse waveform and the output from trigger 350. Thus, as trigger 350 is normally off and as key 346 is normally positioned as shown to supply +ve potential to C.W. unit 347, the normal condition of trigger 352 is on. When key 346 is operated the trigger 350 remains set on for one word period and is reset off again at the next following digit-33 time by the $\overline{33}$-pulse input to gate 351 thereof. It is, however, still on at digit-32 time and therefore, at digit-33 time, the last (32-time) pulse emerging from the unit delay of the trigger, gates a digit-33 pulse through gate 356 and puts trigger 352 off. Once trigger 352 is off the trigger 350 cannot be set again so that when switch 346 is operated, the trigger 350 goes on for one-word time period only and gives an output to the gate 357 of a further trigger 358 between digit times 2 and 34 inclusive. It should be noted that when switch 346 reverts to its normal position as shown, the trigger 352 is put on again and the circuit is ready for another one-shot operation.

When the trigger 350 is thus put on for one word time period, it puts the further trigger 358 on for one word time and this latter trigger gives an output, forming the SS waveform supplied to gate 276 of the delay chain DC, Fig. 11B, from its associated delay 359 from digit-34 time of one word period to digit-32 time of the next word period. The trigger 358 is a buffer trigger to minimise the possibility of erratic working of the circuit.

The one-shot circuit can be used in either of two ways which, for convenience, will be called A-working and B-working respectively. If A-working is required, switch 362 is closed and a positive potential is applied through C.W. unit 363 to one input of gate 364 supplied also with the 32-pulse of C waveforms whereby the latter passes a 32-pulse as soon as a coincidence is obtained between the address track and instruction address digits. This 32-pulse from gate 364 is applied through cathode follower 365 to gate 366 of a trigger 367 so as to set the latter on. A signal thereafter comes up on the line 106 feeding the junction point 313, Fig. 11D, from digit-33 time until the trigger 367 is put off. Such trigger 367, of course, stays on until the one-shot switch 346, discussed above, is operated. The trigger 358 then gives its output as described and a 9-pulse is passed by gate 368 and after inversion in inverter 369 closes gate 370 at digit 9 time and puts the trigger 367 off again. With A-working the one-shot operation cycle is effective at every coincidence. It should be noted that as soon as a signal comes up on the line 106 the normal operation of the machine is stopped as explained previously.

In the case of B-working, the switch 371 is closed and the trigger 367 is put on via C.W. unit 372 and gate 373 only when both B- and C-waveforms are active, that is to say, in alternate coincidences. (It will be remembered that each coincidence changes the state of the B trigger.)

The effect of closing the A or B switches 362, 371 may now be summarised. When A-switch 362 is closed a signal appears on the line 106 at the first coincidence and stops the operation of the machine because nothing can then come from the inverter 312 (Fig. 11D). However, the machine is set into operation again to the next coincidence by depressing key switch 346 which, through the one-shot circuit arrangements described, puts the trigger 367 off for at least one word period and this trigger is set again at the next coincidence. A somewhat similar effect is obtained in B-working in which the B-switch 371 is closed before the switch 346, but in this case the machine operates again until two coincidences have been obtained.

The one-shot circuit is also used for starting the machine. In this case the START switch 241 (Fig. 11B) is closed and conditions the gate 276. When the one-shot circuit is operated to provide the SS waveform from trigger 358, the inverter 278 gives a zero output and gates 265 and 240 are both closed. The machine then obeys a completely blank order. This calls the next order from address zero and this order starts the programme.

When the machine is receiving input data from the input mechanism ID (Fig. 1) appreciable time may elapse before the machine is ready for the next computing operation. It is possible that the machine may not be ready when the next operation is called for by an operator. This condition can be detected by means of the further trigger 375 having its gate 376 controlled by a potential derived through C.W. unit 377 from lead 108 which is at active level when the input mechanism ID is operating. By calling for a test operation (i.e. CF digits 111 so as to make j k l junction control waveforms all active at gate 378) the machine is then stopped, only if not ready, by a signal on the line 106 derived from the trigger 375 which is turned on through gate 379. This trigger is automatically cleared to its off state by the input mechanism removing the previous potential on lead 108 from the C.W. unit 377 when it has completed its input operation. A similar arrangement is used in conjunction with the output mechanism OD.

*Read/write decoder*

Fig. 11G shows the arrangements of the read/write decoder RWD of the machine. These comprise a trigger arrangement 381 having one of its gates 382 controlled by the 32-pulse and B-waveforms and by the output of gate 387 through cathode follower 388 whereby the trigger is set on at digit-32 time for one word period when the signal outputs at PI17, PI18 and PI19 of the delay chain DC (Fig. 11B) and the $\overline{pC}$- and B-waveforms are all active. In the trigger 381 the delay 384 thereof is supplied with the $\overline{32}$-pulse waveform as a rest medium instead of the usual "Reset" pulses (see Fig. 2B). This is effected because a steady output is required from the trigger when it is set on instead of the normal series of separated pulses that this type of trigger normally provides. The trigger 381 provides the $\bar{R}$-waveform from its delay 384, such waveform being active when information is to be read from the store S. The R-waveform is, of course, the inverse of the $\bar{R}$-waveform and is derived through amplifier 385 and inverter 386.

*Track selectors*

Fig. 11F shows the arrangements of the track selection staticisors TSM for determining which of the eight word tracks RT0, RT1 . . . RT7 on the magnetic drum or disc MD of the store S is read from or written into. These arrangements comprise three triggers 390, 392 and 394 all arranged to be set on (if at all) at digit-32 time by application of the 32-pulse waveform to one controlling input of their associated gates 391, 393, 395. These triggers are arranged to give a continuous output in a similar manner to the trigger 381 shown in Fig. 11G by substitution of a rest pulse formed by a mix of the $\overline{33}$-pulse waveform and the related setting digit (delayed by one digit period) in associated mixers 396, 398, 400.

The triggers 390, 392 and 394 are fed with signals coming from either gate 401 or gate 402 according to whether the B or the $\bar{B}$-waveform is in its active state. Gate 401 is supplied with the PI23 output from the delay chain DC (Fig. 11B) and it is clear, therefore when this gate is open, that at digit-32 time the triggers 390, 392 and 394 staticise respectively digits 10, 9 and 8 in the instruction word in view of the separation of the inputs to the different triggers by the additional unit delays 397 and 399. Such digits 8, 9 and 10 specify the track number of the first address A1 of the instruction word so that the respective $m, \overline{m}, n, \overline{n}$ and $o, \overline{o}$ waveform outputs of the three triggers signal the track required. Similarly when the $\bar{B}$-waveform is active to open gate 402 fed with the PI1 output from the delay chain DC, the three triggers staticise digits 30, 31 and 32 of the instruction word, which specify the track number of the second address A2. The $\overline{m}$, $\overline{n}$ and $\overline{o}$ outputs are made available in the usual way through inverters 403, 404, 405.

In the machine concerned a time of at least four beat periods must elapse between writing and reading or before reading after change of track. This lapse of time must be provided by the programme of instructions.

WRITE/READ CIRCUITS

The arrangements of the decoder circuits DCD used for controlling the selection of the required write/read head DTH0 . . . DTH7 and hence its associated track RT0, RT1 . . . RT7 together with the conditioning of such head for either writing or reading are shown in Fig. 13.

Referring to Fig. 13, the 8 heads DTH0 . . . DTH7 are shown as each connected to an individual writing driver circuit 410 and to an individual reading preamplifier 411. As the arrangement of each head is substantially identical only one, that of head DTH0, will be described.

The writing driver circuit 410 is of any convenient kind, e.g. comprising a push-pull amplifier circuit, for feeding output signals to the associated head. Such circuit is arranged so that the valves thereof may be supplied, e.g. at their suppressor grids, with an inhibiting bias potential from an associated writing switch 412. The latter is in the form of a gate provided with 4 controlling inputs connected respectively to the $m$ or $\overline{m}$, $n$ or $\overline{n}$ and $o$ or $\overline{o}$ waveform generators, Fig. 11F and to the $\overline{R}$-waveform generator of the read/write decoder arrangements, Fig. 11G. The preamplifier 411, to whose input the associated head is connected, is likewise arranged in the form of a thermionic amplifier to which an inhibiting bias potential can be applied from an associated preamplifier switch 413 which is again in the form of a gate having three controlling inputs connected respectively to the $m$ or $\overline{m}$, $n$ or $\overline{n}$ and $o$ or $\overline{o}$ waveform generators, Fig. 11F. The writing switch 412 and the preamplifier switch 413 associated with the head DTH0 are each conditioned by the same combination of $m$, $n$ and $o$ waveforms, namely by the $\overline{m}$, $\overline{n}$ and $\overline{o}$ waveforms. The remaining heads are similarly controlled in pairs but by different combinations of the $m$, $n$ and $o$ waveforms so that any particular combination of such waveforms, determined by the track digits of either the address A1 or the address A2 of the instruction word, serves to render only one head of the 8 operative. In accordance with the form of the $\overline{R}$-waveform so such selected head is either used for writing or for reading.

The inputs to each of the writing driver circuits 410 are supplied from a common input line 414 fed from a modulator 415 of conventional form and controlled by a number converter circuit 416 which serves to modify the "pulse" or "no-pulse" input signal form of lead 102 into the appropriate type of waveform needed for energising the writing drivers. Such number converting circuits are now well known and depend for their formation upon the type of recording, e.g. "return to zero," "non-return to zero" which is used. The modulator 415 is arranged to be operative whenever an appropriate output potential is supplied from a modulator switch 417 which is conditioned by the $\overline{R}$-waveform to supply such potential when at its active level. When the $\overline{R}$-waveform is at its inactive level, the modulator switch supplies an inhibiting bias voltage to the modulator to suppress the operation of the latter and prevent any input to the writing driver circuits 410.

The signal output from each of the preamplifiers 411 is likewise fed to a common lead 418 connected to the input of a main amplifier 419 whose output is then fed to a pulse squaring circuit 420 and from thence to a shaper 421 of the form already described whereby the output on lead 101 from the latter is in the correct form for use within the other parts of the computing machine.

ARITHMETIC UNIT

The arithmetic unit AU contains five word-length registers. Firstly, the accumulator word register ACC1 having the aforesaid facilities of add, subtract, or not-equivalent to and having included in its circulation path a shift SH1 which may operate in either direction, i.e. to effect signal delay or to effect signal advance. Secondly, the second word register ACC2 which may be switched to form part of the circulation of the accumulator register ACC1; e.g. to accommodate a double-length word arising from multiplication. Thirdly, the word register R to contain a multiplier number word and having a controllable shift SH2 in its circulation. Fourthly, the word register D to hold a multiplicand number word and fifthly the word register called the X-register. The output from the accumulator register ACC1 is also supplied to the conditional order selector COS.

When the arithmetic unit is not engaged in effecting multiplication the R-, D- and X-registers can be used as immediate access stores but when the unit is effecting multiplication, only the X-register can be used in this way.

The present machine does not include an automatic multiplier and multiplication accordingly has to be programmed.

The arithmetic unit AU (Fig. 1) will now be described in detail with reference to Figs. 12A, 12B, 12C, 12D and 12F.

X-register

Figure 12C:
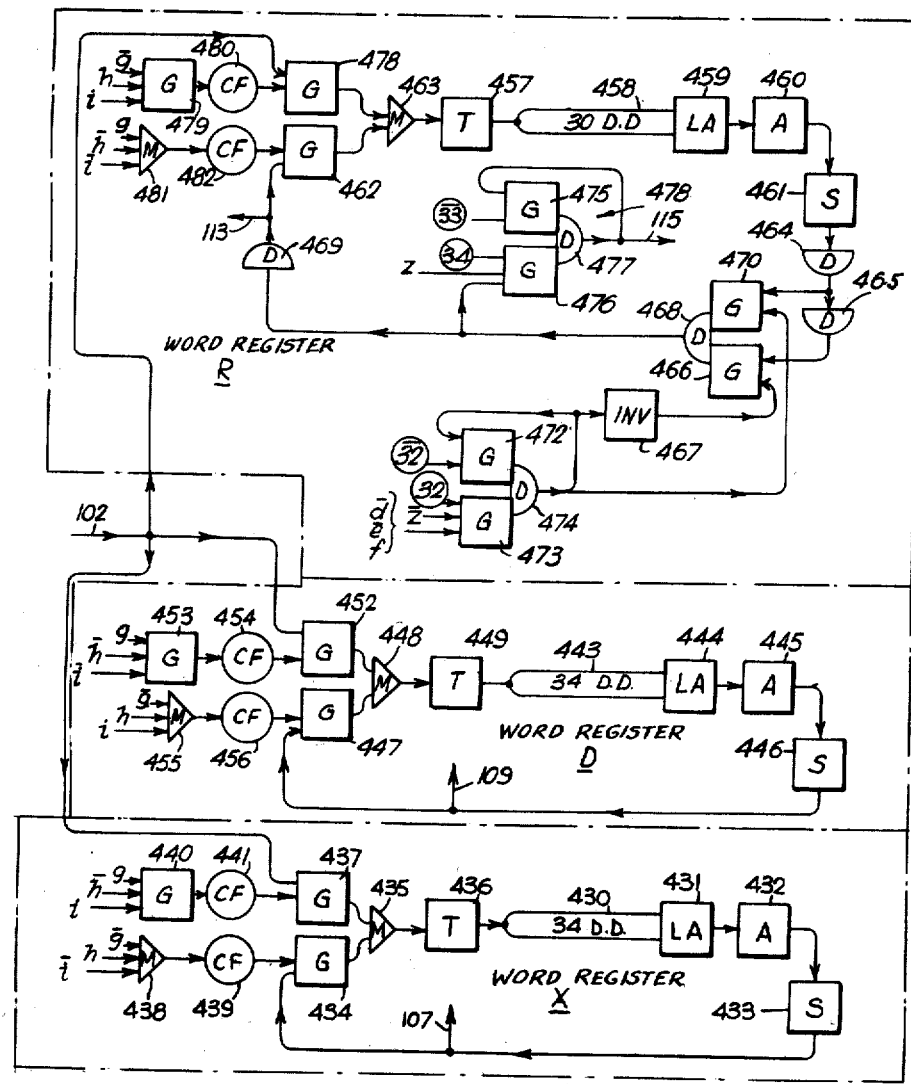

Referring first to Fig. 12C the word register X comprises a magneto-striction delay line 430, as already described with reference to Fig. 6B, which produces a delay of 34 digit periods. Any signals in this register normally circulate via the line amplifier 431, amplifier 432, shaper 433, gate 434, mixer 435 and line driver 436. The contents of this X-register can be fed to the accumulator register ACC1 or to the delay chain DC via the shaper 433 and lead 107.

The circulation control gate 434 of the delay line is controlled by the $\overline{g}$, $\overline{h}$ and $\overline{i}$ function control waveforms, conforming to the staticised TFA digits. These waveforms are combined in mixer 438 and are fed to the control input of the gate 434 by way of cathode follower 439. The opposite input gate 437 of the line has one input connected to the input lead 102 from the store S while its control input is supplied through cathode follower 441 from gate 440 controlled by the $g$, $\overline{h}$ and $i$ function control waveforms.

When it is desired to change the contents of the X-register, the $g$, $\overline{h}$ and $i$ function control waveforms applied to gate 440 become active simultaneously and gate 437 is opened so that the word on the lead 102 flows into the X-register via mixer 435. At the same time the staticised TFA digits are such that each of the $\overline{g}$, $h$ and $i$ waveforms applied to the gate 434 through mixer 438 fail to open this gate 434 and any word already in the register is thereby eliminated.

D-register

The multiplicand or word register D is similar and is also shown in Fig. 12C. It comprises 34-digit period delay line 443, line amplifier 444, amplifier 445, shaper 446, circulation control gate 447, mixer 448 and line driver 449. An output from the register is fed over lead 109 through the accumulator input gates AG to the accumulator register ACC1. Gate 452 is fed with input signals from lead 102 and is controlled through cathode follower 454 by output of gate 453 conditioned by the $g$, $\overline{h}$ and $\overline{i}$ function control waveforms (staticised TFA digits). Circulation gate 447 is controlled by the $\bar{g}$, $h$ and $i$ function control waveforms through mixer 455 and cathode follower 456. This D-register operates in a similar manner to the X-register.

R-register

The multiplier or word register R is basically similar but in addition it has a controllable shift circuit SH2 included in its circulation loop. It comprises a 30-digit delay line 458, line amplifier 459, amplifier 460, shaper 461, circulation control gate 462, mixer 463 and line driver 457. The loop connection between shaper 461 and gate 462 can be by one of two paths, the first through two series-connected unit delays 464, 465, gate 466 and further delays 468 and 469 and the second through delay 464, gate 470 and said delays 468, 469.

The shift circuit SH2 operates and is controlled as follows: The gates 470 and 466 are opened inversely to each other owing to the action of inverter 467 in the control potential supply path from unit delay 474 of the trigger circuit formed by elements 472, 473 and 474. Suppose gate 470 is open, then gate 466 is necessarily closed and the circulation of the register is via unit delay 464, gate 470, unit-delay 468, unit delay 469 to gate 462. The total delay in the circulation loop is thus 33 digit periods and the timing of the contents of the register is advanced by one digit period relative to the rest of the machine at each circulation thereof during the time in which the gate 470 is open.

On the other hand, if gate 466 is open, then gate 470 will be closed and the circulation of the register will then include the extra unit delay 465 and becomes 34 digit periods; the timing of the contents of the register will then keep in step with other numbers in the machine.

Gates 470 and 466 are controlled by the trigger circuit constituted by gates 472, 473 and the loop through unit delay 474. This part of the circuit constitutes a one-digit staticisor which gives an output (when activated) lasting for one word period. This trigger has its initiating gate 473 controlled by the 32-pulse waveform, the $\bar{d}$, $\bar{e}$ and $f$ function control waveforms (staticised AF digits) and the $\bar{z}$-waveform from trigger 340, Fig. 11D, which are at active level to open gate 473 when the shift circuit SH2 in the R-register is required to operate to decrease the circulation time from 34 to 33 digit periods. Under this condition, at digit-32 time a pulse is applied to gate 473 and sets the trigger "on." This "on" state persists until the following digit-32 time when $\overline{32}$-pulse waveform to gate 472 resets the trigger off again.

The $\bar{d}$, $\bar{e}$ and $f$ control waveforms are each in active condition during the whole of the multiplication process whereas the input $\bar{z}$-waveform is at active level only during alternate word period times. In consequence the multiplier number word circulating in the R-register is shifted one digit period for every two word period time during the multiplication process. The junction between unit delays 468 and 469 is connected to one control input of gate 476 also controlled by the 34-pulse and $\bar{z}$-waveforms. This gate forms part of a further trigger 478 including gate 475 and unit delay 477. Gate 475 is supplied with the $\overline{33}$-pulse waveform while the output from delay 477 is fed by way of lead 115 to input gate 451 of the accumulator input gate unit AG, Fig. 12F. By means of the gate 476 the digits of the multiplier number word are inspected in turn (starting with the least significant) during the multiplication process, at the junction of the delays 468 and 469 and if an examined digit is of binary value "1" it sets the trigger 478 on for one word time and thus, by the consequential opening of gate 451, Fig. 12F, allows one copy of the multiplicand number word in the D-register on output lead 109 of that register to flow into the accumulator register ACC1.

In this way a product is built up because, as will be explained below, the circulation time of the accumulator register ACC1 during multiplication is one digit period short of the normal (34-digit periods) length and so effectively divides the contents of the accumulator register by a factor of two in each circulation. As will be understood more readily later, during multiplication, the accumulator register ACC1 is working with a double length circulation path. It will be noted that the input gate 476 to the trigger 478 is, in part, controlled by the $\bar{z}$-waveform. As this waveform is active only in alternate word times, the trigger 478 can be set on, if at all, only in alternate word times. The input to the R-register is from the lead 102 through gate 478 controlled by the $\bar{g}$, $h$ and $i$ waveforms (staticised TTA digits) applied to gate 479 and fed thereto through cathode follower 480. The register can be cleared by closing gate 462 which is normally kept open by the mix of the $g$, $\bar{h}$ and $\bar{i}$ waveforms in mixer 481 and applied through cathode follower 482.

Accumulator registers

The arrangements of the accumulator register ACC1 are shown in Fig. 12A and comprises 30-digit period delay line 484 and its associated amplifiers and gates and having in its circulation loop the controllable shift circuit SH1 in which either none, one or both of the unit delays 485 and 486 may be included in the circulation path according to which of the gates 487, 488 (or 489) or 490 respectively, is open. It should be noted that during multiplication, the $\bar{d}$, $\bar{e}$ and $f$ function control waveforms (staticised AF digits) are all at active level so that the gate 487 is open and the circulation path length is one digit period short of the normal 34 digit periods. Outputs of various timings can be taken at the output lines marked Ac0, Ac1 and Ac2. The circulation path also includes the unit delay 491 and may or may not include the further word register ACC2, shown in Fig. 12B and comprising 34-digit delay line 492 and its associated amplifiers and gates 493, 494 (Fig. 12A), 495 and 496. These last mentioned gates are controlled, in part, by signals from gate 497 conditioned by the $j$, $\bar{k}$ and $l$ function control waveforms (staticised CF digits), gates 493 and 494 (Fig. 12A) and gates 495 and 496 (Fig. 12B) being opened or closed inversely to one another by the action of the inverter 498.

The rest of the circulation path of the accumulator register ACC1 (or both registers ACC1 and ACC2) includes the accumulator gate 499, the unit delay 500 and the adder/subtractor unit/not-equivalent circuit AS.

Adder/subtractor/not-equivalent

The details of the adder/subtractor/not-equivalent circuit AS are also shown in Fig. 12A and comprise the usual two half-adder sections of a logical adder arrangement. Gates 502, 503 have their respective outputs combined in mixer 519 and then applied to unit delay 516. One output from the latter is then fed as a control input to gates 518 and 503. Gate 503 is additionally controlled by an input from unit delay 501 and by the output from gate 507. Gate 518 is also controlled by the input from unit delay 501. Gate 502 is controlled by inputs derived respectively from gate 507, from gate 501 or delay 516 and from the output of mixer 520 which is itself supplied with the outputs of gates 513 and 521. Gate 521 is supplied with the input from unit delay 500 and is controlled by the output of inverter 515 itself supplied from gate 514 conditioned by the $d$, $e$ and $\bar{f}$ function control waveforms (staticised AF digits). Gate 513 has one input supplied from inverter 522 associated with the second half-adder and is also conditioned by the same $d$, $e$ and $\bar{f}$ waveforms.

Gate 518 supplies its output to inverter 517 which, in turn, is connected to one control input of each of gates 523 and 524. The other control inputs of gate 523 are derived respectively from the outputs of unit delay 500, and from delays 501 and 516. This gate 523 supplies its output to inverter 522. Gate 524 is further supplied at its other control inputs with the output from inverter 522 and with the output from unit delays 501 and 516. Gate 525 has one control input supplied from inverter 522 and its other from unit delay 500. The outputs from gates 524, 525 are combined in mixer 526 and are then fed by way of unit delay 527 to the line driver of the 30-digit delay line 484 of the ACC1 register already described.

This adder/subtractor unit circuit AS gives the sum (or difference) of numbers represented by words coming respectively from the unit delays 500 and 501. Before describing the adder the purpose of the auxiliary circuit feeding the gates 502, 503, 493 and 494 will first be explained. This circuit is the round carry supply normally used with adders in machines of the present type. When ordinary addition is being carried out a voltage from gate 504 fed via mixer 505, cathode follower 506 and (normally open) gate 507 opens gates 502 and 503 except at digit-34 time. When double-length arithmetic is being carried out the combined function control waveform $\bar{j}, k, l$ (obtained over lead 132 from delay 508 associated with gate 497, Fig. 12B) applied to gate 509 conditions such gate to open, but under the influence of the z-waveform which is also applied to such gate 509 and which, as already described in connection with the odd/even word time counter in the control circuit, Fig. 11D, is active in alternate word periods only, causes such gate to allow only alternate pulses at digit-34 time to pass to the gates 502 and 503 (and gates 493 and 494). When the function control waveforms $d, \bar{e}$ and $f$ applied to the gate 510 are all active, this gate gives an output which, by the action of inverter 511 and gate 507, produces carry suppression during the whole word time and hence gives a not-equivalent output by the action of the right-hand side of the adder only. This will become more clear later.

If addition (as distinct from subtraction) is required, the function control waveforms $d, e,$ and $\bar{f}$ will not be present at the gates 513 and 514 so that the gate 513 will be closed and the gate 521, by action of inverter 515, will be open.

The adder adds the numbers coming from the delays 500 and 501 respectively. For ease of explanation, the current digits of these numbers will be represented by L and M respectively and the current digit from the delay 516 will be represented by K. This last digit during an addition process is, in fact, the current carry digit. The digits present on the various lines of the circuit are indicated by applied legends in the usual notation, thus the input of the inverter 517 is represented by M&K and the output from this inverter is inverse or not M&K, represented by $\overline{M\&K}$.

As has already been stated, K represents the current carry digit; this is readily seen to be the case if a first entry to the gate 502 is considered. Suppose this entry is one in which L=1 and M=1, the L digit passes via gate 521 and mixer 520, the M digit is present on the line marked "M or K" and there will be an input present on the line coming from gate 507 and inverter 511. Consequently the digit pulse passes gate 502 and mixer 519 and after being delayed by unit delay 516 will become the current carry pulse K at the next entry. This pulse in turn may produce a further carry pulse, e.g. at gate 503 if the next M is of value "1" and/or at the gate 502 if the next L is of value "1."

Since the round carry supply circuit closes gates 502 and 503 at digit-34 time (this is the time of occurrence of digit-32 of the operands because two unit delays are included between the output lead 101 from the store S and the adder input) it will be clear that the carry circuit described above prevents any latent carry being present in the adder at the time of adding the least significant digits. The least significant digits are present at the input to the adder at 2-pulse time.

The action of the adder is best explained by the scheme given below in which all possible permutations of the current digits L, M and K are considered and in which the outputs from the elements 523, 522, 524, 525 and 526 are given. The output from the mixer 526 is the important one because this is the final sum-representing signal. It will readily be seen that the carry digits are produced on the lines marked K.

This scheme may readily be checked if the following points are remembered:

(1) Gate 523 yields a one when, and only when, L, M or K and $\overline{M\&K}$ are all ones.

(2) Inverter 522 always gives the inverse of the output from gate 523.

(3) Gate 524 yields a one when, and only when, the output from inverter 522 is a one, i.e. when L, M or K and $\overline{M\&K}$ are all ones.

(4) Gate 525 yields a one when, and only when, the output from inverter 522 and L are both ones.

(5) The output from mixer 526 is a mix of the outputs from gate 524 and 525.

ADDITION

| Current digits | | | | | | Output from unit | | | | |
|---|---|---|---|---|---|---|---|---|---|---|
| L | M | K | M&K | $\overline{M\&K}$ | M or K | 523 | 522 | 524 | 525 | 526 |
| 0 | 0 | 0 | 0 | 1 | 0 | 0 | 1 | 0 | 0 | 0 |
| 0 | 0 | 1 | 0 | 1 | 1 | 0 | 1 | 1 | 0 | 1 |
| 0 | 1 | 0 | 0 | 1 | 1 | 0 | 1 | 1 | 0 | 1 |
| 0 | 1 | 1 | 1 | 0 | 1 | 0 | 1 | 0 | 0 | 0 |
| 1 | 0 | 0 | 0 | 1 | 0 | 0 | 1 | 0 | 1 | 1 |
| 1 | 0 | 1 | 0 | 1 | 1 | 1 | 0 | 0 | 0 | 0 |
| 1 | 1 | 0 | 0 | 1 | 1 | 1 | 0 | 0 | 0 | 0 |
| 1 | 1 | 1 | 1 | 0 | 1 | 0 | 1 | 0 | 1 | 1 |

It will be seen that the output from the mixer 526 is, in fact, the required sum. Delay 527 is included merely to make up the proper circulation time of the accumulator register ACC1.

At this point it is convenient to explain how the adder acts as a not-equivalent circuit. When a not-equivalent determination is to be made between the numbers represented by L and M, the $d, \bar{e}$ and $f$ waveforms (staticised AF digits) applied to gate 510 stops the output from inverter 511. In consequence gate 507 is closed and gates 502 and 503 are inhibited and no carry pulses are generated so that the adder gives an output whenever L≠M. If this is not obvious, the above addition scheme should be consulted from which it can be seen that in all those cases where K=O there is an output from mixer 526 only when L≠M.

If the gate 514 is opened by the aforesaid function control waveforms, $d, e$ and $\bar{f}$, then gate 521 is closed by the action of inverter 515 and gate 513 is opened at the same time and under such conditions the circuit arrangements act as a subtractor. The operation of the circuit in this condition will be explained by the following subtraction:

```
  1 1 0 0 0 1 1 0
  0 1 1 0 1 1 0 0
  ─────────────────
  0 1 0 1 1 0 1 0
```

As before, L and M represent the current digits from the delays 500 and 501 respectively and K represents the digit emerging from the delay 516. The following scheme shows the output from the various elements in the circuit when this subtraction operation is effected:

SUBTRACTION

| Current digits | | | | | | Output from unit | | | | | | |
|---|---|---|---|---|---|---|---|---|---|---|---|---|
| L | M | K | M&K | M̄&K̄ | M or K | 523 | 522 | 502 | 519 | 524 | 525 | 526 |
| 0 | 0 | 0 | 0 | 1 | 0 | 0 | 1 | 0 | 0 | 0 | 0 | 0 |
| 1 | 0 | 0 | 0 | 1 | 0 | 0 | 1 | 0 | 0 | 0 | 1 | 1 |
| 1 | 1 | 0 | 0 | 1 | 1 | 1 | 0 | 0 | 0 | 0 | 0 | 0 |
| 0 | 1 | 0 | 0 | 1 | 1 | 0 | 1 | 1 | 1 | 1 | 0 | 1 |
| 0 | 0 | 1 | 0 | 1 | 1 | 0 | 1 | 1 | 1 | 1 | 0 | 1 |
| 0 | 1 | 1 | 1 | 0 | 1 | 0 | 1 | 1 | 1 | 0 | 0 | 0 |
| 1 | 1 | 1 | 1 | 0 | 1 | 0 | 1 | 1 | 1 | 0 | 1 | 1 |
| 1 | 0 | 1 | 0 | 0 | 1 | 1 | 0 | 0 | 0 | 0 | 0 | 0 |

It will be seen from this scheme the subtraction has been chosen so that all possible permutations of the digits L, M and K are considered. The scheme is self-explanatory but it should be noted that the output from the mixer 519 gives the K digit in the next entry. As before, the output from the mixer 526 gives the required difference-representing result.

*Accumulator input gates*

The various inputs to the accumulator registers are by way of the accumulator input gate circuits AG which is shown in Fig. 12F. This device includes gate 437 controlling the signal input on lead 107 from the X-register, Fig. 12C and conditioned by the $a$, $\bar{b}$ and $c$ control function waveforms (staticised TTA digits) gate 540 controlling the input on lead 111 from input unit ID and conditioned by the $\bar{a}$, $b$ and $\bar{c}$ waveforms, gate 541 controlling the input on lead 101 from the store S and conditioned by the $a$, $b$ and $c$ waveforms, gate 542 controlling the input on lead 113 from the R-register and conditioned by the $\bar{a}$, $b$, and $c$ waveforms, gate 450 controlling the input on lead 109 from the D-register and conditioned by the digits $a$, $\bar{b}$ and $\bar{c}$ waveforms and gate 451 controlling the entry of the D-register output on lead 109 by the output over lead 115 from the D-register trigger 478, Fig. 12C and the function control waveforms $\bar{d}$, $\bar{e}$ and $f$ through gate 609. Other gated inputs are provided as shown but as they are not concerned with an understanding of the invention they will not be described. The outputs from all input gates are applied, by way of a time adjusting unit delay, such as the 2-digit delay 550 or unit delays 551, 552 to lead 110 and thence to the word register ACC1, Fig. 12A.

*Conditional order selector*

The arrangements of the conditional order selector COS are shown in Fig. 12D. This circuit provides two outputs which are used, as already described, in the control unit system CL, Figs. 11A–11F. These outputs are the TC34-waveform from the inverter 560 and an output from unit delay 361 which is mixed with the B-waveform output from the beat circuit BC of the control system CL, Fig. 11D, to form the TC.B control waveform. The conditional order selector is used to determine the course of a computation in accordance with certain characteristics of numbers previously derived during the computation. The two characteristics in question are:

(1) The number is zero
(2) The number is negative

If the first characteristic is to be looked for, the gate 566 is opened by the $\bar{j}$, $k$, and $\bar{l}$ waveforms (staticised CF digits) applied thereto whereas if the second characteristic is to be looked for, the gate 565 is opened by the $\bar{j}$, $k$, and $l$ waveforms applied thereto.

The AcO output of the accumulator register ACC1, Fig. 12A, is continually applied to the input gate 569 of a trigger circuit arrangement 567 and if this AcO output contains at least one "1"-digit pulse the trigger will be set on. In consequence an output will not be obtained from inverter 570 unless the number is zero and gate 564 controlled by such inverter 570 will be closed as will also gate 561. Consequently, if the gate 566 has been opened its output will not pass gate 564 if at least one "1"-digit pulse occurs in the AcO number and at the appropriate time the 34-pulse applied to gate 561 will not pass and the output from inverter 560 at digit-34 time will be active. On the other hand, if the AcO number is zero the opposite result will be obtained, that is to say at digit-34 time the output from inverter 560 will be zero.

In a similar manner gate 565 is conditioned by the $\bar{j}$, $\bar{k}$ and $l$ waveforms when the sign of a number has to be examined and gate 563 will be opened. In this case the Ac2 output from the unit delay 486, Fig. 12A, which is also applied to the gate 563 and, has a timing such that its sign digit occurs at digit-33 time, will appear at the input to gate 561 with such sign digit at digit-34 time owing to the action of unit delay 562. Thus, if the number examined is negative its sign digit will be a "1"-digit pulse and the 34-pulse will pass through the gate 561 and the corresponding output of the inverter 560 at digit-34 time will be zero. Thus in both cases, if the condition looked for exists, the TC34-waveform is zero at digit-34 time.

The trigger 360 supplying the TC component of the TC.B waveform will be set on in either case by the output from unit delay 562 if the condition looked for exists. This trigger 360 is set on at 34-digit time and remains on until the next following 34-digit time.

MACHINE OPERATION

Having described the arrangement and operation of the separate units of the machine its manner of operation as a whole will now be briefly described. In order to give a comprehensive but brief explanation, the operation of the machine in response to four different types of instruction will now be outlined. The selected instructions are as follows:

(a) Simple addition
(b) Multiplication
(c) Shift to produce division by $2^n$
(d) Conditional transfer (a) *Simple addition instruction*

Consider an addition instruction which is lying in, say, track 1 word location 2 and assume that the A2 address signals of the previous instruction still circulating around the instruction register ISR which includes delay line 273, Fig. 11B, specifies such instruction address (0010000010). The beat circuit BC of the machine operates to find coincidence between the address track signals on lead 105 and the A2 address input PI2 in the circuit arrangements of Fig. 11D and when found, trigger 305, Fig. 11D, is set on to make the B waveform active whereby the word in such address [001 0000010] of the store S flows into the control register delay chain DC, Fig. 11B, through lead 101 and gate 240. This order may, for example, read as follows:

| A2 | TTA | AF | TFA | CF | | A1 |
|---|---|---|---|---|---|---|
| 001 | 0001000 | 1 1 1 | 0 0 0 | 0 0 0 | 001 | 0 000101 |

Simultaneously gate 265, Fig. 11B, is closed to erase the previous instruction. Gate 265 however, opens again after one beat and gate 240 closes at the same time owing to the return of the C waveform to its inactive level so that the new instruction now circulates in the instruction register ISR.

The CF triggers 280, 282, 284, Fig. 11C, are set by the outputs PI20, PI21, PI22 of the delay chain as the instruction word flows in and the coincidence circuit of the beat circuit BC in Fig. 11D then begins to search for coincidence of the address signals on lead 105 with the A1 digit signals which are continuously presented 001 0000101. When this coincidence is achieved, the remaining digits of the function part of the instruction word are staticised in the triggers groups TTA, TFA and AF, Fig. 11C and the appropriate gates are opened. Thus, in this case, the TTA triggers 301, 302, 303 provide outputs whereby the $a$, $b$ and $c$ waveforms are all at active level so that gate 541, Fig. 12F, opens to allow the number from such A1 address in store S now on lead 101 to enter the accumulator register ACC1 through lead 110, Fig. 12A. The circulation line of the accumulator register ACC1 is not broken because the $\bar{d}$ waveform supplied to mixer 533 controlling gate 499 is at active level. The adder/subtractor arrangements are in the add condition because the $d$ waveform is not at active level and these will proceed to add this arriving store number to the previous register content since the arriving store number on lead 110 will be presented to delay 501 and the existing content of register ACC1 will be presented at the same time to delay 500, Fig. 12A through gates 494 and 499. The coincidence obtained in the coincidence circuit, Fig. 11D changes the B trigger 305 to make the $\bar{B}$-waveform active and a coincidence with the second address A2 of the instruction is then sought. When this second coincidence is achieved the B-trigger 305 again reverses, the B-waveform becoming active and the $\bar{B}$-waveform becoming zero inactive. The existing instruction word in the instruction register ISR of Fig. 11B is then replaced by that specified by the second address A2 by closure of gate 265 and opening of gate 240, Fig. 11B as already mentioned.

The AF staticisor triggers 290, 291, 292 were set at the first coincidence and cleared at the second coincidence. However only one word from the store S was added into the accumulator register ACC1 because the TTA staticisor triggers 301, 302, 303 controlling the gate 541, Fig. 12F, were set according to the TTA digits of the instruction for only one word time, being reset at the next 32-digit time by the $\overline{32}$-pulse waveform.

(b) *Multiplication instruction*

In multiplication, the multiplier and multiplicant are first called into the R- and D-registers respectively by suitable successive instructions and then the multiplication instruction flows these into the instruction register ISR of the control system. A typical multiplication instruction word is:

| A2 | TTA | AF | TFA | CF | | A1 |
|---|---|---|---|---|---|---|
| 010 | 0100011 | 0 0 0 | 0 0 1 | 0 0 0 | 1 0 1 | 010 1010001 |

In a multiplication order the adder/subtractor circuit, Fig. 12A, is set at add (because the AF digit controlling the state of the $d$ waveform is not a 1) and a series of additions of the multiplicand takes place via the gate 451, Fig. 12F because the gate 600, which supplies a control potential to such gate 451 is open for the duration of time between the two coincidences. In this case, the address locations are separated by at least 62 word positions. (A2 being later than A1.) This allows a possible 31 additions of the multiplicand to take place in alternate word times (because double-length writing must be specified with the multiply order) corresponding to the 31 digits, other than the sign digit of the multiplicand number. For the multiply order alone to give the correct product, the operands must be positive. If they are not both positive then by suitable programming the correct product can be attained. To ensure that the most significant half of the product is in delay line 484 of the ACC1 register at the end of multiplication, the address A2 of the multiply order must be an odd number.

(c) *Divide shift instruction*

To produce a shift which divides the number in the accumulator register ACC1 by $2^n$, i.e. multiplies by $2^{-n}$, an order of the following kind is used.

| A2 | TTA | AF | TFA | CF | A1 |
|---|---|---|---|---|---|
| 010 | 0001101 | 0 0 0 | 0 1 1 | 0 0 0 | 0 0 0 | 010 0 000001 |

On the coincidence with the address A1, the AF triggers are set ($\bar{d}$, $e$ and $f$ waveforms are active). These outputs open gate 487, Fig. 12A, and the content of accumulator register ACC1 circulates through this path. In addition, since the $e$ and $f$ waveforms (AF digits) are at active level, the gate 488 opens at digit-time 32 if there is a "1" representing pulse in the sign pulse position of the circulating number (this comes from delay 485). A signal is supplied from delay 601 because, inter alia, the $\bar{i}$ waveform is present to open gate 602 and allow the 31-pulse to pass therethrough. This repeats the previous sign digit in digit-32 time as is required to give a true division by two at each circulation of a negative number. These gates remain open until the time of coincidence with the second address A2 so that the circulating number is shifted in all by the number of word times that A2 is later than A1. In this particular case $n=12$. If, as is the case in the instruction quoted, an input number source is also specified then the result is $a \times 2^{-12} + b \times 2^{-11}$ when $\underline{a}$ is the number in the accumulator and $\underline{b}$ is the number from the source. This type of order is used inter alia in the binary to decimal conversion required by the initial order routine.

(d) *Conditional transfer instruction*

A typical conditional transfer instruction word may read as follows:

| A2 | TTA | AF | TFA | CF | | A1 |
|---|---|---|---|---|---|---|
| 001 | 0001011 | 1 0 1 | 0 0 0 | 0 0 0 | 0 0 1 | 001 0 001000 |

This order is one in which transfer is conditional on the contents of the accumulator register ACC1 being negative.

As soon as this order is received in the instruction register ISR of the control system CL, the CF triggers 280, 282, 284, Fig. 11C are set whereby the $\bar{j}$, $\bar{k}$ and $l$ waveforms become active, and remain so until another order is read in so that a test of the sign of the accumulator content in the Ac2 signal applied to gate 563, Fig. 12D is made every word time. If the sign of this accumulator content becomes negative then the $\overline{TC34}$-waveform is at inactive level at digit-34 time. At the time of coincidence with the first address A1, the staticisor trigger groups TTA, AF and TFA are set and, in the example given, the content of the X-register is added to the accumulator register ACC1. However the state of the B-waveform is not changed so that the order specified by the first address A1 replaces the present order in the control register delay chain, Fig. 11B, because the gate 240 will open at the coincidence and gate 265 will close. The new order will be obeyed in the usual way. If the accumulator content is positive (i.e. the condition is not satisfied) the $\overline{TC34}$-waveform is active at digit-34 time so that the B-trigger state changes and the coincidence with the second address A2 is sought in the usual manner. In this case the next order to be obeyed is that specified by the second address A2. Thus a branching of the programming is effected.

Various modifications may obviously be made without departing from the scope of the invention as defined in the appended claims. For example, other forms of unit- or word-delay devices may be employed while the trigger circuit devices may be of a form other than that described.

I claim:

1. An electronic digital computing machine arranged for operation with serial mode word signals and comprising a data store of the circulating type in which each word storage address is made available sequentially during time intervals which are identified by a separate address signal presented immediately prior to the access time of each storage location, a control system including a control register arranged for operation with instructions containing separate first and second storage address signal portions, means for presenting each of said separate first and second address signal portions simultaneously on separate output channels in time synchronism with said address signals of said data store, a signal coincidence test circuit having one input connected to receive said address signal from said store and a second input connected by way of signal-controlled switch means to each of said output channels of said instruction address signal presenting means, said signal controlled switch means being arranged to route either said first or said second address signal portions to said second input, said coincidence testing circuit providing an output signal indicative of coincidence between said input signals, a two-stable-state trigger circuit device connected to supply output control signals to said signal-controlled switch means, said trigger circuit when in one state providing a first type output control signal which operates said signal-controlled switch means to route said first address signal portion of the instruction to said coincidence test circuit and when in its other state providing a second type output control signal which operates said signal-controlled switch means to route said second address signal portion of the instruction to said coincidence test circuit and means for causing the output signal from said coincidence test circuit resulting from coincidence between said applied address signals and said first address signal portion to operate said trigger circuit to provide a second type output signal and for causing said output signal from said coincidence test circuit resulting from coincidence between said second address signal portion and said address signals to operate said trigger circuit to provide a first type output signal whereby said coincidence test circuit operates alternately to establish coincidence between said address signals of said data store and said first and second address signal portions of said instruction.

2. An electronic digital computing machine according to claim 1 in which said control register comprises a circulating delay line device having an input terminal and at least two time-spaced tapping points along said delay line, said tapping points constituting said means for presenting said time synchronized first and second storage address signal portions of an instruction retained in said delay line.

3. An electronic digital computing machine as claimed in claim 1 which includes operand signal test means for examining an operand signal in said machine and for providing an output signal indicative of the result of said test and means, operated by said output signal from said operand signal test means for inhibiting the operation of said trigger circuit by an output signal from said coincidence testing means resulting from coincidence between said address signals and a first address signal portion of an instruction thereby to prevent the establishment of coincidence between said address signals and the second address signal portion of the instruction.

4. An electronic digital computing machine according to claim 3 in which said trigger circuit means includes first, second and third gate circuits, circuit means connecting the output of said first and second gate circuits to a delay device imposing a delay of one digit period of said pulse train signals, a loop circuit connecting the output of said delay device to a controlling input of said first gate circuit, circuit means for supplying the output from said coincidence testing means to an input of each of said second and third gate circuits, a source of repetitive pulse signals occurring at the end of each word signalling time period, controlled circuit means supplying said pulse signals to an input of each of said second and third gate circuits, circuit means supplying an output from said digit delay device to an input of said third gate circuit and further circuit means including a signal inverter supplying the output from said third gate circuit to an input of each of said first and second gate circuits.

5. An electronic digital computing machine according to claim 4 in which said control register comprises a circulating delay line device having an input terminal and at least two time-spaced tapping points along said delay line, said tapping points constituting said first and second signal outputs for providing respectively the repeated versions of said first and second storage address signal portions of an instruction retained in said delay line.

6. An electronic digital computing machine arranged for operation with serial mode number and instruction signals and with instruction signals which contain at least two separate first and second storage address defining signal portions, said machine including a data word store of the circulating type in which each of a plurality of separate storage locations is rendered accessible in sequential order, said store including means for providing a dynamic serial form address defining signal for defining each of said storage locations as it is about to become accessible, a control system including an instruction register for retaining a currently operative instruction, said register having a signal input for receiving said instruction and first and second signal outputs providing respectively repeated versions of said first and second storage address signal portions of the retained instruction in time synchronism with each of said dynamic address defining signals of said store, signal coincidence testing means having first and second signal inputs and a coincidence signal output, first and second circuit means each including signal-controlled switching means respectively connecting said first and second signal outputs of said instruction register to the first signal input of said coincidence testing means, circuit means for applying said dynamic address defining signals of said store to said second signal input of said coincidence testing means and a trigger circuit device having two stable states and arranged to be reversed from one state to the other state by successive coincidence signals from said signal coincidence testing means, said trigger circuit providing alternately active outputs connected to control respectively said signal controlled switching means of said first and second circuit means.

References Cited in the file of this patent

UNITED STATES PATENTS

| 2,672,283 | Havens | Mar. 16, 1954 |
| 2,686,632 | Wilkinson | Aug. 17, 1954 |
| 2,771,595 | Hendrickson et al. | Nov. 20, 1956 |
| 2,777,635 | Tootill et al. | Jan. 15, 1957 |

OTHER REFERENCES

A Functional Description of the EDVAC, Moore School of Electrical Engineering of U. of Pennsylvania, May 3, 1951, vol. 1, pages 2–1 to 2–18. Vol. II, Figures (104–ILC–2); (104–2LD–8); (104–2LD–7).

Proceedings of conference on Automatic Computing Machines, published by Commonwealth Scientific and Industrial Research Organization in conjunction with the Dept. of Electrical Engineering of the University of Sydney, Melbourne, Australia, April 1952, pages 127–138 and accompanying Figures 1–3 which have no page number.